United States Patent
Panat et al.

(10) Patent No.: US 11,817,588 B2
(45) Date of Patent: Nov. 14, 2023

(54) THREE-DIMENSIONAL LATTICE BATTERIES VIA ADDITIVE MANUFACTURING

(71) Applicants: Carnegie Mellon University, Pittsburgh, PA (US); The Curators of the University of Missouri, Columbia, MO (US)

(72) Inventors: Rahul Panat, Pittsburgh, PA (US); Jie Li, Katy, TX (US); Jonghyun Park, Rolla, MO (US); Mohammad Sadeq Saleh, Pittsburgh, PA (US)

(73) Assignees: Carnegie Mellon University, Pittsburgh, PA (US); The Curators of the University of Missouri, Columbia, MO (US)

(*) Notice: Subject to any disclaimer, the term of this patent is extended or adjusted under 35 U.S.C. 154(b) by 212 days.

(21) Appl. No.: 16/593,622

(22) Filed: Oct. 4, 2019

(65) Prior Publication Data

US 2020/0112030 A1  Apr. 9, 2020

Related U.S. Application Data

(60) Provisional application No. 62/766,151, filed on Oct. 4, 2018.

(51) Int. Cl.
*H01M 4/80* (2006.01)
*H01M 4/48* (2010.01)
(Continued)

(52) U.S. Cl.
CPC .............. *H01M 4/80* (2013.01); *H01G 11/26* (2013.01); *H01G 11/56* (2013.01); *H01G 11/70* (2013.01);
(Continued)

(58) Field of Classification Search
CPC ...... H01M 4/80; H01M 4/483; H01M 4/5825; H01M 4/525; H01M 4/38; H01M 4/661; H01M 4/664; H01M 4/663; H01M 10/0568; H01M 2004/021; H01M 2300/0017; H01M 2004/028; H01M 2004/025; H01M 4/801; H01M 4/13; H01M 4/139; H01M 4/0471;
(Continued)

(56) References Cited

U.S. PATENT DOCUMENTS

| | | | |
|---|---|---|---|
| 7,674,671 B2 | 3/2010 | Renn et al. | |
| 2013/0189602 A1* | 7/2013 | Lahiri | H01G 4/008 977/762 |

(Continued)

OTHER PUBLICATIONS

Saleh et al. "Three-dimensional microarchitected materials and devices using nanoparticle assembly by pointwise spatial printing." Sci. Adv. 2017, 3:e1601986, Mar. 3, 2017 (Year: 2017).*

(Continued)

*Primary Examiner* — Michael L Dignan
(74) *Attorney, Agent, or Firm* — The Webb Law Firm

(57) ABSTRACT

Provided here is a method of manufacturing a lattice electrode useful in an energy storage device such as a battery or capacitor. A lattice electrode useful in an energy storage device such as a battery or capacitor also is provided, along with energy storage devices such as batteries or capacitors.

16 Claims, 25 Drawing Sheets
(7 of 25 Drawing Sheet(s) Filed in Color)

(51) Int. Cl.

| | |
|---|---|
| H01M 4/58 | (2010.01) |
| H01M 4/525 | (2010.01) |
| H01M 4/38 | (2006.01) |
| H01M 4/66 | (2006.01) |
| H01G 11/26 | (2013.01) |
| H01G 11/56 | (2013.01) |
| H01G 11/70 | (2013.01) |
| H01M 10/0568 | (2010.01) |
| H01G 11/68 | (2013.01) |
| H01M 4/02 | (2006.01) |
| H01G 11/50 | (2013.01) |

(52) U.S. Cl.
CPC ............ *H01M 4/38* (2013.01); *H01M 4/483* (2013.01); *H01M 4/525* (2013.01); *H01M 4/5825* (2013.01); *H01M 4/661* (2013.01); *H01M 4/663* (2013.01); *H01M 4/664* (2013.01); *H01M 10/0568* (2013.01); *H01G 11/50* (2013.01); *H01G 11/68* (2013.01); *H01M 2004/021* (2013.01); *H01M 2004/025* (2013.01); *H01M 2004/028* (2013.01); *H01M 2300/0017* (2013.01)

(58) Field of Classification Search
CPC ........ B82Y 40/00; H01G 11/26; H01G 11/56; H01G 11/70; H01G 10/0568; H01G 11/68; H01G 11/50; H01G 11/84; H01G 11/86; H01G 11/36; H01G 11/46
See application file for complete search history.

(56) References Cited

U.S. PATENT DOCUMENTS

| | | | | |
|---|---|---|---|---|
| 2017/0149083 | A1* | 5/2017 | Duoss | H01G 11/26 |
| 2018/0244518 | A1* | 8/2018 | Miraglia | C12Q 1/6806 |
| 2019/0103600 | A1* | 4/2019 | Greer | H01M 4/8875 |

OTHER PUBLICATIONS

Saleh et al. "Three-dimensional microarchitected materials and devices using nanoparticle assembly by pointwise spatial printing." Sci. Adv. 2017, 3:e1601986, Mar. 3, 2017—Supplemental Information (Year: 2017).*
Taillades et al. "Silver: high performance anode for thin film lithium ion batteries." Journal of Power Sources 125 (2004) 199-205 (Year: 2004).*
Xue et al. "A Hierarchical Silver-Nanowire—Graphene Host Enabling Ultrahigh Rates and Superior Long-Term Cycling of Lithium-Metal Composite Anodes." Adv. Mater. 2018, 30, 1804165 (Year: 2018).*
Sun et al. "3D Printing of Interdigitated Li-Ion Microbattery Architectures." Adv. Mater. 2013, 25, 4539-4543 (Year: 2013).*
Ashby, "The properties of foams and lattices", Philosophical Transactions of the Royal Society of London A, 2006, pp. 15-30, vol. 364.
Chen et al., "Lattice Metamaterials with Mechanically Tunable Poisson's Ratio for Vibration Control", Physical Review Applied, 2017, pp. 024012-1-024012-11, vol. 7.
Chen et al., "3D printed hierarchical honeycombs with shape integrity under large compressive deformations", Materials and Design, 2018, pp. 226-234, vol. 137.
Esmanski et al., "Silicon inverse-opal-based macroporous materials as negative electrodes for lithium ion batteries", Advanced Functional Materials, 2009, pp. 1999-2010, vol. 19.
Fu et al., "Free-standing Ag/C coaxial hybrid electrodes as anodes for Li-ion batteries", Nanoscale, 2013, pp. 11568-11571, vol. 5.
Guo et al., "Carbon scaffold structured silicon anodes for lithium-ion batteries", J. Mater. Chem., 2010, pp. 5035-5040, vol. 20.
Guo et al., "A polymer scaffold binder structure for high capacity silicon anode of lithium-ion battery", Chem. Commun., 2010, pp. 1428-1430, vol. 46.
Ho et al., "A super inkjet printed zinc-silver 3D microbattery", J. Micromech Microeng., 2009, pp. 1-5, vol. 19.
Jung et al., "Ag/poly (3,4-ethylenedioxythiophene) nanocomposites as anode materials for lithium ion battery", Solid State Ionics, 2011, pp. 50-57, vol. 187.
Kim et al., "Three-dimensional porous silicon particles for use in high-performance lithium secondary batteries", Angew. Chem. Int. Ed., 2008, pp. 10151-10154, vol. 47.
Lan et al., "Hierarchically porous TiO2 microspheres as a high performance anode for lithium-ion batteries", J. Mater. Chem. A, 2014, pp. 1102-1106, vol. 2.
Li, J. et al., "A hybrid three-dimensionally structured electrode for lithium-ion batteries via 3D printing", Materials and Design, 2017, pp. 417-424, vol. 119.
Li, J. et al., "Macro/Micro-controlled 3D lithium-ion batteries via additive manufacturing and electric field processing", Scientific Reports, 2018, pp. 1-11, vol. 8, No. 1846.
Li, X. et al., "Mesoporous silicon sponge as an anti-pulverization structure for high-performance lithium-ion battery anodes", Nature Communications, 2014, pp. 1-7, vol. 5, No. 4105.
Li, X. et al., "Mechanical Metamaterials: Smaller and Stronger", Nature Materials, 2016, pp. 373-374, vol. 15.
Liu et al., "A pomegranate-inspired nanoscale design for large-volume-change lithium battery anodes", Nature Nanotechnology, 2014, pp. 187-192, vol. 9, No. 3.
Long et al., "Three-dimensional battery architectures", Chem. Rev., 2004, pp. 4463-4492, vol. 104.
Paulsen et al., "Printing conformal electronics on 3D structures with aerosol jet technology", Future of Instrumentation International Workshop (FIIW) Proceedings, 2012, Gatlinburg, TN, pp. 1-4.
Pikul et al., "High-power lithium ion microbatteries from interdigitated three-dimensional bicontinuous nanoporous electrodes", Nature Communications, 2013, pp. 1-5, vol. 4, No. 1732.
Rahman et al., "Structure, electrical characteristics, and high-temperature stability of aerosol jet printed silver nanoparticle films", Journal of Applied Physics, 2016, vol. 120, Article No. 075305.
Saleh et al., "Three-dimensional microarchitected materials and devices using nanoparticle assembly by pointwise spatial printing", Sci Adv., 2017, pp. 1-8, vol. 3, Article No. e1601986.
Saleh et al., "Polycrystalline micropillars by a novel 3-D printing method and their behavior under compressive loads", Scripta Materialia, 2018, pp. 144-149, vol. 149.
Schaedler et al., "Ultralight Metallic Microlattices", Science, 2011, pp. 962-965, vol. 334.
Shao et al, "3D Freeze-Casting of Cellular Graphene Films for Ultrahigh-Power-Density Supercapacitors", Adv. Mater., 2016, pp. 6719-6726, vol. 28.
Sun et al., "3D Printing of Interdigitated Li-ion Microbattery Architectures", Adv. Mater., 2013, pp. 4539-4543, vol. 25.
Taillades et al., "Silver: high performance anode for thin film lithium ion batteries", Journal of Power Sources, 2004, pp. 199-205, vol. 125.
Wang et al., "Strength and plasticity of nanolaminated materials", Materials Research Letters, 2016, DOI: 10.1080/21663831.2016.1225321.
Xu et al., "Three-dimensional Au microlatices as positive electrodes for Li—O2 Batteries", ACS Nano, 2015, pp. 5876-5883, vol. 9, No. 6.
Zhang et al., "Three-dimensional bicontinuous ultrafast-charge and -discharge bulk battery electrodes", Nature Nanotechnology, 2011, pp. 277-281, vol. 6.
Zhao et al., "Hierarchical micro/nano porous silicon Li-ion battery anodes", Chem. Commun., 2012, pp. 5079-5081, vol. 48.

* cited by examiner

THREE-DIMENSIONAL LATTICE BATTERIES VIA ADDITIVE MANUFACTURING

CROSS REFERENCE TO RELATED APPLICATIONS

This application is entitled to and claims priority to U.S. Provisional Patent Application No. 62/766,151 filed Oct. 4, 2018, the disclosure of which is incorporated herein by reference in its entirety.

STATEMENT REGARDING FEDERALLY SPONSORED RESEARCH

This invention was made with government support under Grant No. 1747608 awarded by the National Science Foundation. The government has certain rights in the invention.

BACKGROUND OF THE INVENTION

Energy storage devices, such as Li-ion batteries, are central to consumer electronics industry, transportation systems, energy grids, and defense systems. Conventional electrodes for use in such devices are made by mixing the electrode materials with glue-like substances called binders which are pressed onto the electrodes; giving rise to a block geometry that restricts ion transport due to its lack of controlled porosity. For example, for Li-ion batteries, it is estimated that 30-50% of the electrode remains unutilized during the battery operation. Advances have been made in electrode technology and production methods, but have not resulted in easily manufactured, high specific capacity electrode structures.

High capacity electrodes for use in energy storage devices are therefore needed, as well as simple, inexpensive methods of making those electrodes.

SUMMARY OF THE INVENTION

A method of manufacturing a component for an electrochemical device is provided. The component may be an electrode, a current collector, or an electrolyte material. The method comprises depositing a three-dimensional open cell lattice onto a surface of a substrate by droplet-based printing of nanoparticles comprising a lattice-forming material, the lattice comprising a plurality of unit cells, each unit cell comprises a plurality of trusses joined at one or more joints and, together with one or more unit cells of the lattice, forming a repeated pattern of trusses defining at least a portion of the lattice and with a periodicity of at least 1 µm per unit cell.

A three-dimensional electrode, current collector, or electrolyte material structure also is provided, comprising: an open cell lattice comprising a plurality of unit cells defined by a plurality of porous, interconnected, conductive metal, ceramic, or carbonaceous trusses having a diameter above 1 µm, periodically-spaced with periodicity of at least 1 µm per unit cell.

An electrochemical cell and a battery or capacitor also are provided comprising the three-dimensional electrode, current collector, or electrolyte material structure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

(FIG. 2A) Body centered cubic lattice and (FIG. 2B) a simple dense cube of same overall size, with the length to diameter ratio of each truss of the lattice is about 10. (FIG. 2C) A comparison of surface area to volume ratio as the number of cells increases. The lattice surface to volume ratio asymptotically converge to 0.50 while the cube converges to zero. The y axis in the graph is normalized by single cell edge length (a).

(FIG. 4A) Schematic of the fabrication of 3D micro-architected battery electrodes by assembling nanoparticles in 3D space at microscale using the aerosol jet printing process. Heat removes the binders then sinters the nanoparticles to form the 3D lattice with hierarchical porosity. (FIG. 4B) Droplet-based 3D printing method for lattice components of energy storage devices. (FIG. 4C) Perspective image of the 3D micro-lattice as printed (left image) and as-sintered (center image) with FIB section (right image) of the truss member. The porosity at a length scale of approximately 100s of microns or more is seen from printing in space, while those near a micron are seen within the truss elements.

(FIG. 5A) Top and side images of micro-lattice electrodes with a height of approximately 250 µm. (FIG. 5B) Top and side images of micro-lattice electrodes with a height of approximately 450 µm. (FIG. 5C) Solid block of silver with same dimension as the micro-lattice printed using the AJ method.

(FIG. 6A) The specific capacity for the micro-lattice and block structures, each with a thickness of about 250 µm and 450 µm. (FIG. 6B) The areal capacity for the micro-lattice and block structures, each with a thickness around 250 µm and 450 µm.

(FIG. 7A) The specific capacity of the micro-lattice (samples A1 and B1) and block (samples C1 and D1) electrodes as a function of number of cycles at different C-rates. (FIG. 7B) The specific capacity of the micro-lattice (samples A2 and B2) and block (samples C2 and D2) electrodes as a function of the number of cycles at different C-rates. (FIG. 7C) Comparison of the average specific capacity of the micro-lattice and block structure thicknesses of about 250 µm and 450 µm.

(FIG. 9A) SEM image of silver electrode 250 µm micro-lattice structure as-fabricated. (FIG. 9B) SEM image of silver electrode 250 µm micro-lattice structure fully lithiated. (FIG. 9C) SEM image of silver electrode 250 µm micro-lattice structure fully de-lithiated. (FIG. 9D) Higher magnification image of the as-fabricated electrode in FIG. 9A. (FIG. 9E) Higher magnification image of the as-fabricated electrode in FIG. 9A. (FIG. 9F) Higher magnification image of the fully de-lithiated electrode in FIG. 9C. (FIG. 9G) Higher magnification image of the fully de-lithiated electrode in FIG. 9C. (FIG. 9H) SEM image of silver electrode 250 µm block structure as-fabricated. (FIG.

9I) SEM image of silver electrode 250 μm block structure fully lithiated. (FIG. 9J) SEM image of silver electrode 250 μm block structure fully de-lithiated.

(FIG. 10A) Illustration of a cell with a porous electrode. (FIG. 10B) Micro-lattice (left image) and block (right image) structures used in modeling.

(FIG. 12A) The experimental and simulation specific capacity results of the micro-lattice and block structured electrodes. (FIG. 12B) The spatial state of charge (SOC) distribution and flux distribution (red arrows) at 0.02 V for the block structure. (FIG. 12C) The spatial SOC distribution and flux distribution (red arrows) at 0.02 V for the micro-lattice structure.

(FIG. 13A) The unit cell of the micro-lattice (left image), the cubic structure (center image), and the spherical structure (right image). (FIG. 13B) The discharge voltage profile for the micro-lattice, cubic, and spherical structures at 0.5C. (FIG. 13C) The discharge capacity at 0.1C, 0.5C, and 0.8C for the micro-lattice, cubic, and spherical structures. (FIG. 13D) The spatial SOC distribution at 0.02 V for the micro-lattice, cubic, and spherical structures. (FIG. 13E) The gradient of solid phase potential (V/m) for the micro-lattice, cubic, and spherical structures.

(FIG. 14A) The specific capacity at 0.5C for the micro-lattice structured electrode as function of thickness and solid phase volume fraction (VF). (FIG. 14B) The specific capacity at 0.5C for the cubic structured electrode as function of thickness and VF. (FIG. 14C) The specific capacity at 0.5C for the spherical structured electrode as function of thickness and VF. (FIG. 14D) The areal capacity for the micro-lattice structured electrode as function of thickness and VF. (FIG. 14E) The areal capacity for the cubic structured electrode as function of thickness and VF. (FIG. 14F) The areal capacity for the spherical structured electrode as function of thickness and VF.

(FIG. 15A) A cubic structure with column widths of 0.5w, 0.75w, 1.00w, and 1.25w. (FIG. 15B) A cubic structure constructed by unit cells of different numbers of columns, specific and areal capacity of cubic structured electrode. (FIG. 15C) The specific and areal capacity of a cubic structure with different column widths. (FIG. 15D) The specific and areal capacity of a cubic structure with a different number of columns.

(FIG. 16A) The schematic of an adjustable micro-lattice structure. (FIG. 16B) The specific and areal capacity as a function of column (bottleneck) width for a cubic structure. (FIG. 16C) The specific and areal capacity as a function of column number for a spherical structure. (FIG. 16D) The schematic of an adjustable spherical structure. (FIG. 16E) The specific and areal capacity as a function of column (bottleneck) width for a spherical structure. (FIG. 16F) The specific and areal capacity as a function of column number for a spherical structure.

DESCRIPTION OF THE INVENTION

Figure 1:
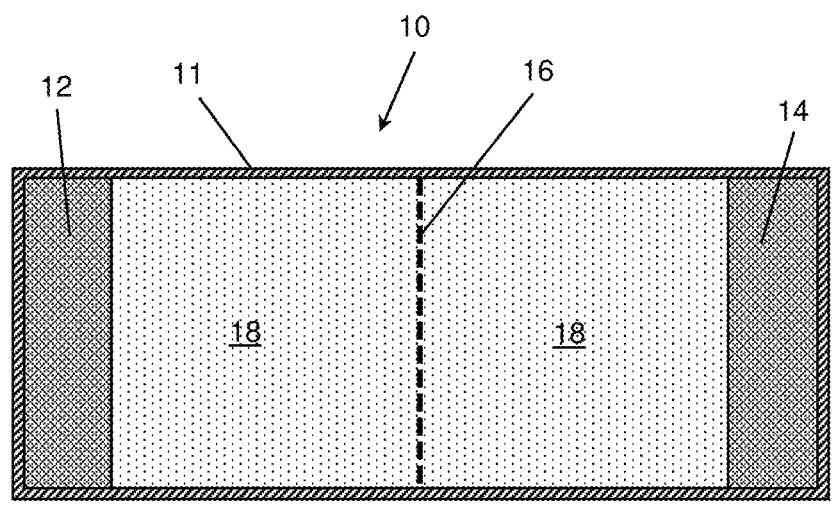
FIG. 1: A schematic of a battery.

Other than in the operating examples, or where otherwise indicated, the use of numerical values in the various ranges specified in this application are stated as approximations as though the minimum and maximum values within the stated ranges are both preceded by the word "about". In this manner, slight variations above and below the stated ranges can be used to achieve substantially the same results as values within the ranges. Also, unless indicated otherwise, the disclosure of ranges is intended as a continuous range including every value between the minimum and maximum values. Further, as used herein, all numbers expressing dimensions, physical characteristics, processing parameters, quantities of ingredients, reaction conditions, and the like, used in the specification and claims are to be understood as being modified in all instances by the term "about". Moreover, unless otherwise specified, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like.

As used herein "a" and "an" refer to one or more. The term "comprising" is open-ended and may be synonymous with "including", "containing", or "characterized by". The term "consisting essentially of" limits the scope of a claim to the specified materials or steps and those that do not materially affect the basic and novel characteristic(s) of the claimed invention.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting.

Further, as used herein, the terms "deposited over", "formed over", "over", or "provided over" mean formed, deposited, or provided on but not necessarily in contact with a surface. For example, a layer "formed over" a substrate does not preclude the presence of one or more other layers or films of the same or different composition located between the referenced structures. Likewise, the terms "under", or "provided under" mean formed, deposited, or provided beneath, but not necessarily in contact with a surface.

As used herein, the unit "μm" refers to microns or micrometers, "cm" to centimeters, "nm" to nanometers, "m" to meters, "Cp" to centipoise, "cm$^{2}$" to square centimeters, and "V" to volts.

A "binder" or "binding agent" is any material or substance that holds or draws other materials together to form a cohesive whole mechanically, chemically, by adhesion or cohesion.

As used herein an "electrochemical cell" is an electrochemical unit that comprises electrodes, a separator, and an electrolyte. A "battery" comprises one or more electrochemical cells or electrochemical cell assemblies, with a housing, electrical connections, and optionally electronics for control and protection. Electrodes can be described as anodes or cathodes. For rechargeable cells, such as the ion batteries described herein, the term "cathode" (or positive electrode) designates the electrode where reduction occurs during the discharge cycle; the other electrode is the "anode" (or negative electrode). For lithium-ion cells the cathode is lithium-based. Referring to FIG. 1, which depicts schematically a battery 10, batteries comprise a housing 11 holding a first electrode, or anode 12 and a second electrode, or cathode 14 with a separator 16 and an electrolyte 18 between the first and second electrodes. The housing 11 can be any suitable container or vessel for holding together and containing the other elements of the battery 10. Batteries often are produced in standard sizes and voltages, such as "AA" or "CR2032" batteries, as are broadly-known.

In one non-limiting example, the battery is a lithium ion battery. During discharge, lithium ions are extracted from the first electrode 12 and migrate towards the second electrode 14 via the electrolyte solution 18 and separator 16. The lithium ions from the first electrode 12 pass through the separator 16 and electrolyte solution 18 and are inserted into the second electrode 14. As a result, a current flows from the second electrode 14, passing a load to the first electrode 12. During charging, a charger provides a charging current to the second electrode 14, which cause lithium ions to be extracted from the second electrode 14 and move back towards the first electrode 12 via the electrolyte solution 18 and separator 16. Other electrochemical cells function in essentially the same manner.

Figure 2A:
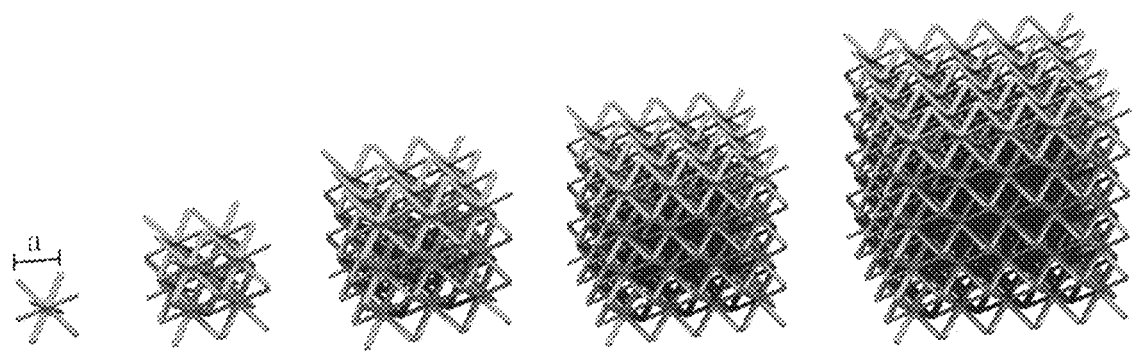
FIGS. 2A-2C.

In one aspect of the invention, provided herein are electrochemical cells, such as in a battery, and methods of making electrochemical cells, and methods of making electrodes for electrochemical cells or other purposes. The electrodes are fabricated by an additive manufacturing method, which may be aerosol jet printing, and are formed into, at least in part, an open cell lattice that allows permeation of a liquid throughout the lattice. A "lattice" is a regular geometrical arrangement of points or objects over an area or in space. In the context of the present disclosure, a lattice is a regular arrangement of trusses to form the lattice. The trusses may be rods that interconnect in a pattern to form an open lattice, as is depicted in FIG. 2A. The trusses are arranged to define a void, or space, between adjacent trusses. In an open lattice, the voids between trusses define open channels through the lattice, permitting fluid flow through the lattice. The voids and open channels can have any suitable shape and configuration.

The trusses can be any suitable shape, so long as the arrangement thereof in the lattice permits flow of liquid throughout the lattice. Non-limiting shapes include: a rod, a cylinder, a column shape, a cylindroid, a scutoid, a conical shape, a polyhedron, a sphere, a spheroid, an ovoid, a spiral, or a helix. Shapes can be combined in order to make the lattice. The open lattice structures can be made of unit cell or cells of arbitrary shapes and sizes comprising two or more trusses joined at a joint or node in a geometric configuration. The smallest group of trusses in at least a portion of the lattice is a unit cell. The open lattice can have repeating or non-repeating unit cells. The number of repeating unit cells of the lattice structure may be any number, such as in the range of 1 to 10,000 in the X-dimension, Y-dimension, and/or Z-dimension. Non-limiting examples of suitable repeated unit geometries include: square, rectangular, triangular, hexagonal, octahedral, rhomboidal, icosahedral, spherical, or any other regular or irregular shape and/or pattern of joined trusses. In one example, the open lattice has an octahedral unit cell comprising eight trusses joined to produce an eight-sided structure, as shown in the examples below, formed from eight trusses joined at six nodes or joints. As would be understood by a person of ordinary skill, the stated geometric designation for any unit cell describes the arrangement of the trusses, and due to the three-dimensional shapes of the trusses, does not define absolutely a resultant three-dimensional structure created by the trusses, for example because the trusses are cylindrical and therefore cannot form a perfect geometric edge (a line) for a shape such as an octahedron. Further, the trusses do not necessarily define every edge of a structure, such as with the octahedral structures of the examples below, a benefit of which includes expandability of the lattice. In some embodiments, the open lattice can have a combination of two or more unit cell geometries. For example, the open lattice can have a combination of hexagonal and octahedral unit cells. The open lattice can have different unit cells of the same or different sizes. The cell size of the open lattice controls the porosity, in terms of voids and open channels. Cells may have a periodicity (average distance between centers of, or like features of adjacent unit cells) ranging from 1 µm to 1 mm, such as from 2 µm to 500 µm, from 10 µm to 1000 µm, or from 100 µm to 300 µm. The structure of the lattice may be such that individual cells are indistinguishable in a dimension, e.g., forming a tubular, or elongated cell, and periodicity may be only in one or two dimensions.

In preparation of the open lattice described herein, the open lattice structures are fabricated by an additive "3D printing" method. The method of 3D printing is selected for its ability to produce trusses as described herein with sufficient accuracy and precision to produce a useful lattice for purposes described herein. The 3D printing method may be a droplet-based printing method, such as aerosol jet (AJ) printing, where the lattice structure material is dispersed in a liquid medium, and is deposited in a suitable pattern to form a lattice structure material solution. "Aerosol jet printing", also referred to as Maskless Mesoscale Materials Deposition or M3D, involves atomization of ink, e.g., by ultrasound or by pressurized gas, and entraining the ink droplets into a stream of gas for delivery to a print head that focuses the gas stream, for example using a gas sheath. Aerosol jet printing is capable of producing and accurately-depositing ink particles of 10 µm or less. As such, aerosol jet printing is capable of producing structures/features 10 µm or greater in size. Aerosol jet printing is capable of delivering suitably-sized nanoparticles, such as metals, amorphous carbonaceous materials (e.g., carbon black), carbon allotropes (e.g., conductive carbon allotropes, such as graphite, carbon nanotubes, graphene, or fullerenes), and ceramics. The nanoparticles may comprise a conductive material, such as a conductive metal, a conductive carbonaceous material (referring collectively to amorphous carbon materials and carbon allotropes), such as carbon black or a carbon allotrope, or an electronically-conductive ceramic, such as Indium tin oxide (ITO), lanthanum-doped strontium titanate (SLT), or yttrium-doped strontium titanate (SYT). By "nanoparticle(s)" it is meant particles in a size range, either absolute or statistically defined (e.g., average or median), of from 1 nm to 1000 nm, or more typically from 1 nm to 100 nm, defined according to any standard, e.g., ultrafine particles or as defined under ISO/TS 80004.

An AJ printer creates an aerosol mist of the droplets of ink comprising the lattice structure material from a reservoir by using either a pneumatic or an ultrasonic atomizer and utilizes an aerodynamic focus to deposit aerosolized materials such as metal nanoparticles onto the substrate. Pneumatic atomization is used for the printing of thicker liquids such as polymers. The aerosol jet printing may be carried out with an atomizer gas flow rate of 1-30 sccm (standard cubic centimeters per minute) and a sheath gas flow rate of 1-70 sccm, which varies with particular liquid media and viscosities.

Aerosol printing "ink" comprises of nanoparticles suspended in a solvent. The solvent may be any suitable solvent, for example and without limitation: deionized water, ethylene glycol, toluene, hexane, 2-methoxyethanol, glycerol, 2-amino-2-methyl-1-propanol (AMP), tetradecane, or a combination of two or more of the preceding liquids. The solution may comprise a rheology modifier, such as ethylene glycol, N-vinylpyrrolidone, or hydrophobically modified ethylene oxide urethane (HEUR), or a combination of two or more rheology modifiers. The solvent and rheology modifier may be the same, as is the case of ethylene glycol. The nanoparticles may be metal nanoparticles. Other suitable materials for deposition include ceramic materials, carbonaceous materials, or a combination thereof. Metal materials include, but are not limited to, lithium, sodium, aluminum, magnesium, silicon, zinc, silver, tin, antimony, bismuth, gold, or combinations or alloys thereof. Other types of nanoparticles may include silicon, lithium titanate, tin oxide, silicon oxide, lithium manganese, lithium cobalt oxide, iron sulfide, vanadium pentoxide, lithium nickel cobalt manganese oxide, lithium ion phosphate. Mixtures of different nanoparticles, such as silver, and silver alloys, or graphite, and silicon, may be concurrently deposited, alternated, or deposited at different levels to provide lattices with portions thereof having different physical or electrochemical properties. Carbonaceous materials include, without limitation, graphite, hard carbon, synthetic graphite, carbon black, graphene flakes, carbon nanotubes, or combinations thereof. The metal nanoparticles may be coated with a polymer in order to avoid agglomeration in the dispersion, such as poly(ethylene glycol) (PEG), polyethylenimine, thiols, or amines, or a combination of any of the preceding.

The ink may further comprise a binder or binding agent. Useful binding agents for metal nanoparticles, such as in the context of the ink for use in production of the lattices described herein, include, without limitation: polyalkylene carbonates, acrylic resins, or 2 ⍰ methoxyethanol, or a combination of any of the preceding binding agents. The ink from which the lattice structure is formed may have a viscosity ranging from 1 cP to 1000 cP.

The lattice structures are formed by depositing onto a surface of a substrate a plurality of layers of the component material. Non-limiting examples of suitable substrates include flexible or rigid polymer, metal, alumina, ceramics, silicon structures, diodes, integrated circuit, or a circuit board such as a printed circuit board (PCB). Examples of flexible polymers include but are not limited to polydimethylsiloxane (PDMS), Kapton® (polyimide), or Poly(lactic acid) (PLA). The substrates will provide an electrical path for the printed electrodes to an external circuit. A non-conducting substrate may be coated by methods such as physical vapor deposition or chemical vapor deposition with a thin layer of conducting material, such as a metal, to provide this electrical path. Examples of suitable metal substrates include stainless steel, copper, aluminum, silver, gold, chromium, and tin. Metal substrates may optionally be coated with an additional, different metal. For example, the substrate may be stainless steel, optionally with a 50 nm chromium coating. The substrate may be a component of a battery, supercapacitor, or other structure or device the lattice electrode is to be incorporated into. The lattice structures may be printed on a substrate that is planar or non-planar. The substrate may be selected to withstand heating to the sintering temperature of the material(s) forming the lattice.

The ink from which the lattice structure is fabricated may be dispensed, e.g., using an Aerosol Jet printer, in multiple layers. The process of printing an electrode may involve deposition of one layer of the nanoparticle solution followed by the use of heat or other form of energy to remove (evaporate) the solvent of the ink. The substrate, and therefore the lattice may be heated to a temperature sufficient to remove the solvent by either heating the substrate to a suitable temperature, or by directing a laser at the site of ink deposition. The substrate temperature may be maintained in a range of from, for example and without limitation, 50° C. to 150° C. or increments there between, such as 80° C., 100° C., 110° C., or 125° C. After deposition and removal of solvent, a truss is formed, which by itself or in combination with other trusses, e.g., in a layer of a lattice forms a solid base to receive the next printed layer. The next printed layer may have the same or different composition as the previously deposited layer. This process is repeated as desired, e.g., according to a predetermined lattice configuration, to produce high aspect ratio, and high surface area electrodes, for example as shown in FIG. 4B, without the need for any support material.

The trusses may be deposited perpendicular (normal), at a 90 degree (90°) angle to, a plane of the substrate, or at any other angle to the substrate between 0° and 90°, including any increment there between, such as 5°, 10°, 15°, 20°, 25°, 30°, 35°, 40°, 45°, 50°, 55°, 60°, 65°, 70°, 75°, 80°, or 85°. One or more of the trusses may be deposited normal to the substrate. One or more of the trusses may be deposited at an angle between 10° and 90°, such as between 30° and 40°, to the substrate. The trusses can be 3D printed straight, curved or any other shape suitable for the end use. The trusses can have different shapes, even within a single unit cell, to produce a desired or optimized lattice structure with sufficient structural and electrochemical features.

The as-printed lattice structure may be sintered or joined together by some energy source, such as laser, UV light, or thermal heat. In some examples, the printed lattice structure is not sintered, leaving the lattice structure in a particle format. Sintering is the process of forming a solid mass of material by heat or pressure without melting it to the point of liquefaction. Sintering occurs naturally in mineral deposits, or as a part of a manufacturing process used with metals, ceramics, plastics, and other materials. In the context of the deposited nanoparticles described herein—particularly the metal particles, sintering is a heat treatment applied to a nanoparticle powder structure in order to impart strength and integrity. The temperature used for sintering is below the melting point of the major metal constituent of the nanoparticle, material. After printing, neighboring powder particles are held together by cold welds, which give the compact sufficient "green strength" to be handled. At sintering temperature, diffusion processes cause necks to form and grow at these contact points. As a consequence of the sintering process, water and other liquid medium or solvents, binders, rheology modifiers, and anti-agglomeration coatings are removed by evaporation and burning, and any surface oxides are reduced.

The metal nanoparticles of the electrode material may be sintered by raising the temperature to a temperature below the melting point of the metal nanoparticles. During the sintering process, the temperature of the lattice may be raised at any rate. The temperature may be raised at a rate of less than 5° C. per minute, such as 1° C. per minute. Once the sintering temperature is reached, the sintering process may be stopped by reducing the temperature at any suitable rate, or the maximum sintering temperature may be maintained for any suitable time period, such as for 5 minutes (5'), 10', 20', 30', one hour (1 hr), 2 h, or longer, including increments there between. The lattice nanoparticles may be sintered by heating to temperatures that varies with the material. For example, sintering for silver nanoparticles occur in a temperature range of from about 150° C. to 400° C. Optimal maximum, sintering temperatures, temperature ramp rates, or durations may be empirically determined depending on the composition and structure of the nanoparticles.

Sintering the printed lattice structure introduces smaller, hierarchical porosity into the trusses. The hierarchical porosity can be controlled by varying the sintering temperature, duration, and temperature ramping rates. For example, porosity may vary from 0% to 20% in silver nanoparticle printed lattice structures. As used herein, unless indicated to the contrary, porosity is determined by X-ray computer tomography (CT) scans or by physical cross-sectioning. The hierarchical porosity has pore sizes ranging from 0.005 µm to 500 µm, such as from 0.005 µm to 5 um, and such as that from 10 um to 500 um. Sintering at lower temperatures (e.g., 100° C. to 200° C. for silver) yield lattice structures with higher porosity, such as 20% to 30%. Sintering at higher temperatures (e.g., 201° C. to 550° C. for silver) yield lattice structures with lower porosity, such as 1% to 20%.

A 3D-printed lattice comprises trusses joined at nodes, that is joints between truss structures, such as rods. Each lattice truss ranges from 1 µm to 1 mm in a major dimension (length, that is distance between nodes or joints), depending on the geometry of the lattice, to yield suitable cell periodicity in the range of from 2 µm to 500 µm, and in a lattice structure, trusses can be of the same length or a combination of lengths. For example, the lattice structure may contain trusses that are a single length throughout the lattice structure, or different lengths, to produce certain geometries. Lattice structures may have a length ranging from 100 µm to 5 cm, such as from 100 µm to 1 cm or from 200 µm to 500 µm. The overall size and shape of the lattice may be selected to fit within an electronic component, such as a cell, battery, or capacitor. The truss diameter, e.g., the diameter of a spherical truss, or a non-major dimension, such as a diameter of a rod, with a circular or ovoid cross-section, may range from 1 µm to 500 µm, such as 2 µm to 500 µm, such as 20 µm to 50 µm, such as 1 µm to 100 µm, and can be selected to optimize surface area and liquid flow through the matrix.

An electrically active material may be deposited over at least a portion of the lattice structure to form an outer shell. The lattice structures may be coated, at least in part, with an electrically active material through an appropriate deposition method such as electroplating, atomic layer deposition (ALD), sputtering, physical vapor deposition, or chemical vapor deposition. Non-limiting examples of electrically active materials include conductors, semiconductors, insulators, or combinations thereof, such as, for example and without limitation: tin, zinc, and carbon in the form of graphite or carbon black.

An optional second electrode material can be deposited over a portion of the lattice structure. The lattice structures can be coated with a second electrode material through an appropriate deposition method such as electroplating, atomic layer deposition (ALD), sputtering, physical vapor deposition, or chemical vapor deposition. Non-limiting examples of second electrode materials include tin oxide, tin, lithium cobalt oxide, iron sulfide, vanadium pentoxide, lithium nickel cobalt manganese oxide, lithium ion phosphate, or alloys and/or combinations thereof.

An optional stabilizer material can be deposited over a portion of the lattice structure. When the lattice structures are used as electrodes, the lattice structure can be coated with a stabilizer material to stabilize the solid electrolyte interphase (SEI) present between the electrolyte and the electrode and prevent electrode decomposition. The lattice structures may be coated with a stability material through an appropriate deposition method such as electroplating, atomic layer deposition (ALD), sputtering, physical vapor deposition, or chemical vapor deposition. Non-limiting examples of such stabilizer materials alumina, aluminum alkoxide, or combinations thereof.

As indicated, the present invention relates to making components for energy storage devices, including but not limited to electric cells, batteries, capacitors, electrochemical capacitors (supercapacitors), lead-acid cells, or fuel cells. In one example, the energy storage device is a battery. Lithium ion batteries are common forms of ion. A battery can be a lithium ion, sodium ion, potassium ion, lithium ferrophosphate (LFP), lithium-sulfur, magnesium-sulfur, zinc-lead, or lithium-air battery. The lattice structure described herein may be a component of a battery, including but not limited to an electrode (e.g., anode and/or cathode) or a separator. The electrochemical cell may use sodium, potassium, magnesium, or lithium ions for charge transfer.

Referencing FIG. 1, lattice structures used as the first electrode 12 of the battery 10 may be comprised of metal, ceramic materials, carbonaceous materials, or a combination thereof. Metal materials include, but are not limited to, lithium, sodium, aluminum, magnesium, silicon, zinc, silver, tin, antimony, bismuth, gold, or alloys and/or combinations thereof. Carbonaceous materials include, but are limited to graphite, carbon black, graphene flakes, carbon nanotubes, or combinations thereof. The first electrode 12 can also include a binary, ternary, or higher order mixtures of elements that can be electrodeposited on and alloyed with lithium or sodium, aluminum, magnesium, silicon, and tin. Examples of binary mixtures include Sn—Zn, Sn—Au, Sn—Sb, Sn—Pb, Zn—Ag, Sb—Ag, Au—Sb, Sb—Zn, Zn—Bi, and Zn—Au. Examples of ternary mixtures include Sn—Zn—Sb, Sn—Zn—Bi, Sn—Zn—Ag, Sn—Sb—Bi, Sb—Zn—Ag, Sb—Zn—Au, and Sb—Sn—Bi. An example of a quaternary mixture can include Sn—Zn—Sb—Bi. The first electrode 12 can also include intermetallic compounds of elements (e.g., the pure elements discussed above) and other elements that can be electrodeposited and alloyed with lithium or sodium. Examples of intermetallic compounds include Sn—Cu, Sn—Co, Sn—Fe, Sn—Ni, Sn—Mn, Sn—In, Sb—In, Sb—Co, Sb—Ni, Sb—Cu, Zn—Co, Zn—Cu, and Zn—Ni.

Lattice structures used as the second electrode 14 of the present invention can be a layered oxide, a polyanion, sulfur, sulfur composites with carbonaceous material, or a spinel. Examples of materials suitable for the second electrode 14 include, tin oxide ($SnO_2$), lithium cobalt oxide ($LiCoO_2$), lithium manganese oxide ($LiMn_2O_4$), lithium titanium oxide ($Li_2TiO_3$), lithium nickel oxide ($LiNiO_2$), lithium iron phosphate fluoride ($Li_2FePO_4F$), lithium cobalt nickel manganese oxide ($LiCo_{1/3}Ni_{1/3}Mn_{1/3}O_2$), $Li(Li_aNi_xMn_yCo_z)O_2$ silicon, lithium ferrophosphate ($LiFePO_4$), or combinations thereof.

Lattice structures of the present invention used as first and/or second electrodes 12, 14 may have higher charge capacities and longer cycle lifetime than conventional electrodes. Without being bound by theory, it is believed that the porosity of the lattice structure used as first and/or second electrodes 12, 14 can reduce the risk of electrode pulverization by allowing the lattice structure to expand and contract during operation. As a result, stress build up in the lattice structures used as first and/or second electrodes 12, 14 can be reduced when compared to conventional solid electrodes. As such, batteries prepared with the lattice structures used as the first and/or second electrodes 12, 14 can have a higher charge capacity and longer cycle lifetime than conventional batteries.

Referring to FIG. 1, a separator 16 is a polymeric permeable membrane placed between the first electrode 12 and the second electrode 14 of an electrochemical cell. Examples of suitable polymers for separators include, but not limited to, polyolefin, polyethylene, polypropylene, or combinations thereof, such as, without limitation, ultra high molecular weight polyethylene, such as TESLIN®. The separator 16 may comprise an additional coating.

The electrolyte 18 of the cell or battery 10 may include a liquid electrolyte comprising ethylene carbonate (EC), propylene carbonate (PC), ethyl methyl carbonate (EMC), or a combination thereof. The electrolyte 18 may further comprise salts including but not limited to $LiPF_6$, $LiAsF_6$, $LiClO_4$, $LiBF_4$, lithium triflate, or combinations thereof. The electrolyte 18 can further comprise a non-liquid electrolyte, having, for instance, a polymer electrolyte with suitable additives.

EXAMPLES

Three dimensional porous electrodes in energy storage devices can allow uniform transport of ions, fast charging cycles, and high electrode utilization. Manufacture of three-dimensional electrodes with controlled porosity is difficult to realize.

Additive manufacturing offers a pathway to such structures. However, the nature of the 3D printing processes used thus far limits the possible structures to only a limited number of geometries such as 3D interdigitated structures. Advances in the electrochemical energy storage technologies such as Li-ion batteries have been realized by the introduction of electrode materials that have high charge capacity, electro-chemistries that facilitate effective carrier transfer, and electrode geometries that increase the surface area and relieve mechanical stress. Three dimensional (3D) porous electrode architectures with irregular or regular (e.g., lattices) pore distributions enhance the ingress of Li into the host electrode, while reducing the total diffusion path and hence time necessary for achieving the full utilization of electrode volume. Further, hierarchical porosity leads to an enhanced tolerance of mechanical stress during the demanding intercalation/de-intercalation cycles (much like cellular materials such as bones). A scalable and repeatable manufacturing process that leads to controlled porosity that can work across a wide range of battery materials remains a significant challenge.

Several studies have been carried out to fabricate electrodes with internal porosity or regular lattice structures (Li, X., et al. 2014 Mesoporous silicon sponge as an anti-pulverization structure for high-performance lithium-ion battery anodes, *Nat. Comm.*, 5:4105-4111; Guo, J., et al. 2010 Carbon scaffold structured silicon anodes for lithium-ion batteries, *Journal of Materials Chemistry*, 20:5035-5040; Guo, J., Wang, C. 2010 A polymer scaffold binder structure for high capacity silicon anode of lithium-ion battery, *Chem. Commun.*, 46:1428-1430; Kim, H., et al. 2008 Three-dimensional porous silicon particles for use in high-performance lithium secondary batteries, *Agnew. Chem.*, 52:10305-10308; Liu, N., et al. 2014 A pomegranate-inspired nanoscale design for large-volume-change lithium battery anodes, Nat. *Nanotechnol.*, 9(3):187-192; Zhao, Y., et al. 2012 Hierarchical micro/nano porous silicon Li-ion battery anodes, *Chem. Commun.*, 48(42):5079-5081; Esmanski, A., et al. 2009 Silicon inverse-opal-based macroporous materials as negative electrodes for lithium ion batteries, *Adv. Funct. Mater.*, 19(12):1999-2010; Pikul, J. H.; et al. 2013 High-power lithium ion microbatteries from interdigitated three-dimensional bicontinuous nanoporous electrodes, *Nat. Commun.*, 4:1732-1736). Cathodes consisting of self-assembled nanolattices of an electrolytically active material sandwiched between rapid ion and electron transport pathways were shown to have high charge-discharge rates (Pikul, J. H., et al. 2013 *Nat. Commun.*, 4:1732-1736). Si electrodes with porosity at a length scale of >20 µm were shown to relieve strain and prevent pulverization of the anodes during electrochemical cycling (Li, X., et al. 2014 *Nat. Comm.*, 5:4105-4111). Scaffold electrodes made of carbon sprayed with Si particles (Guo, J., et al. 2010 *Journal of Materials Chemistry*, 20:5035-5040) and sodium carboxymethyl cellulose (Guo, J., Wang, C. 2010 *Chem. Commun.*, 46:1428-1430) were used to improve the strain tolerance of batteries. Using a thermal annealing process, electrodes with a random arrangement of pores were obtained and showed an improved performance (Kim, H., et al. 2008 *Agnew. Chem.*, 52:10305-10308). Freeze casting was used to create directional porosity in graphene that led to fast electrochemical energy storage capacities (Shao, Y., et al. 2016 3D freeze-casting of cellular graphene films for ultra-high-power-density supercapacitors, *Adv. Mater.*, 28(31):6719-6726). A pomegranate inspired battery architecture was developed with high capacity to tolerate lithiation strain (Liu, N., et al. 2014 *Nat. Nanotechnol.*, 9(3):187-192). Fundamental surface electrochemistry was studied for hollow gold tube electrodes with periodic pores fabricated by two-photon lithograph followed by atomic layer deposition and burnout of the polymer (Xu, C., et al. 2015 Three-dimensional Au microlattices as positive elelctrodes for Li—O2 batteries, *ACS Nano*, 9(6):5876-5883; Schaedler, T. A., et al. 2011 Ultralight metallic microlattices, *Science*, 334(6058):962-965). Although significant advances have been made in this area, the electrode shape control, especially in 3D, is limited either due to the nature of the templates and the etching processes. Another limitation is the electrode material compatibility with the processes chemistries that create the porosity. Lastly, the lattice electrodes with hollow tubes (Xu, C., et al. 2015 *ACS Nano*, 9(6):5876-5883; Schaedler, T. A., et al. 2011 *Science*, 334 (6058):962-965), although having controlled geometries, offer a negligible total electrode volume for charge storage for practical devices.

Some of the above issues can be addressed by fabrication of 3D electrodes by slurries or particle dispersions using nozzle-based 3D printing techniques (Sun, K., et al. 2013 3D printing of interdigitated Li-Ion microbattery architectures, *Adv. Mater.*, 25(33):4539-4543; Li, J., et al. 2017 A hybrid three-dimensionally structured electrode for lithium-ion batteries via 3D printing, *Mater. Des.*, 119:417-424; Ho, C. C., et al. 2009 A super ink jet printed zinc-silver 3D microbattery, *J. Micromech. Microeng.*, 19(9):094013). Paste extrusion was used to fabricate laminated interdigitated electrodes at length scales less than 1 mm which showed a power density of 27 µW/mm². Other interdigitated laminate electrodes for Li-ion batteries have also been realized by extrusion printing of graphene oxide (C. C., et al. 2009 *J. Micromech. Microeng.*, 19(9):094013) that resulted in a high mass loading. In our earlier work (Li, J., et al. 2017 *Mater. Des.*, 119:417-424), high aspect ratio interdigitated structures were fabricated by extrusion-based additive manufacturing that overcame the tradeoff between high areal and high specific capacity. That work significantly advanced the field of porous and/or 3D printed batteries. Those manufacturing methods, however, had three significant limitations. First, the extrusion and inkjet printing can be limited by particle loading due to the viscosity effects (Sun, K., et al. 2013 *Adv. Mater.*, 25(33):4539-4543). Secondly, the interdigitated topology, although 3D, is only a subset of the possible complex architectures that may be suitable for different applications. Lastly, the 3D architecture is typically not hierarchical; that is, it does not have length scales spanning several orders of magnitudes, useful for mechanical stress relief (Lan, T., et al. 2014 Hierarchically porous $TiO_2$ microspheres as a high performance anode for lithium-ion batteries, *J. Mater. Chem., A*2(4):1102-1106). To overcome these limitations, we utilize aerosol jet 3D printing to deposit nanoparticles in 3D space in the form of microscale networks with near fully dense truss members (Saleh, M. S., et al. 2017 Three-dimensional microarchitected materials and devices using nanoparticle assembly by pointwise spatial printing, *Sci. Adv.,* 3(3):e1601986).

Although 3D printed batteries can be designed to have superior performance such as high areal density and mechanical stability through 3D printing, few, if any complex 3D printed batteries with controlled hierarchical porosities have been achieved. In aspects, the invention realizes highly complex 3D motifs in the form of micro-lattice electrodes with solid truss elements and hierarchical porosity. In further aspects, the invention results in 3D electrode geometries with increased surface area, electrode utilization, and stress relief, which is tested by comparing its performance with a solid block electrode made by the same material.

Example 1

Materials and Methods

Electrode Material

A solvent based silver (Ag) nanoparticle ink (Perfect-TPS 50 G2, Clariant Group) was used as the Li-ion battery electrode material, due to the commercial availability of the inks (i.e. dispersions) for this printing method (Saleh, M. S., et al. 2017 Sci. Adv., 3(3): e1601986; Rahman, M. T., et al. 2016 Structure, electrical characteristics, and high temperature stability of aerosol jet printed silver nanoparticle films, *J. Appl. Phys.,* 120(7):075305). The Ag nanoparticles within the ink had a size of 30 nanometers (nm) to 50 nm and a particle loading of approximately 40±2 weight percent (wt. %). The Ag nanoparticle ink had a viscosity of approximately 1.5 centipoise (cP). Silver was chosen due to the high specific capacity according to the formation of different silver-lithium (Ag—Li) alloys (up to $AgLi_{12}$) in a low voltage range versus lithium (Taillades, G., Sarradin, J. 2004 Silver: high performance anode for thin film lithium ion batteries, *J. Power Sources,* 125(2):199-205).

Micro-Lattice Design and Architecture

Prior to printing, appropriate lattice geometries were analyzed based on process considerations for 3D printing and the observed surface to volume ratio changes. The open octahedral lattice unit cell of FIG. 2A was chosen as the structure of the electrode, while the block unit cell of FIG. 2B was printed for comparison. The 3D linkages of this structure determine the geometrical features that directly relate to the characteristics of the final printed part. These characteristics include porosity and surface to volume ratio, which determines the specific charge capacity and the degree of freedom at the joints (determines the strain tolerance). The optimized geometry of the conductive part was drawn in AutoCAD 2015 (Autodesk Inc.) using AutoLISP and converted to a program (.prg) file compatible with the software of the printer.

Electrode Fabrication Method

The electrodes were fabricated using Aerosol-Jet (AJ) based 3D printing method. A commercial AJ printer (AJ-300, Optomec Inc.) was used to deposit the Ag nanoparticle solvent-based ink onto stainless steel connector disks with 11 millimeter (mm) diameter and 500 µm thickness that were coated with 50 nm chromium. The platen on which printing occurred was heated to 110° C. to assist in the drying of the mass of nanoparticles by removing the solvents of the ink.

The AJ printing system had two atomizers (one ultrasonic and one pneumatic), a programmable XY motion stage, and a deposition head. To prevent Ag particle agglomeration, the nanoparticle ink was placed in a tube and continuously rotated for a least 12 hours prior to printing, using a Scilogex MX-T6-S tube roller. The Ag nanoparticle ink was placed in the atomizer which continuously generated a mist/dense vapor of particles, where each droplet within the mist was between 1 µm and 5 µm and contained multiple nanoparticles, was guided by nitrogen ($N_2$) carrier gas to the deposition head (Paulsen, J. A., et al. 2012 Future of Instrumentation International Workshop (FIIW), IEEE, 1-4; U.S. Pat. No. 7,674,671 B1). The mist/dense vapor was then focused and driven towards the nozzle of the printer using a $N_2$ sheath gas to form a micro-jet. The printhead nozzle had a diameter of 150 µm, which produced an aerosol stream having a diameter about 10 µm to 15 µm (Rahman, M. T., et al. 2016 *J. Appl. Phys.,* 120(7):075305). The flow rate of the AJ printer during printing was 25 standard cubic centimeters per minute (sccm) with a sheath gas flow of 50 sccm. A shutter was used to stop and resume droplet flow, were applicable, during the printing process.

Block and micro-lattice structures with the same area and different thicknesses, 250 µm and 450 µm, were printed as described in Table 1. After printing, the structures were thermally sintered in a Neytech Vulcan 3-550 programmable furnace at 350° C. for 2 hours.

TABLE 1

| Sample # | Structure | Mass (g) | Thickness (µm) |
|---|---|---|---|
| A1 | Micro-lattice | 0.0008211 | 215 |
| A2 | Micro-lattice | 0.00018789 | 265 |
| B1 | Micro-lattice | 0.000709 | 415 |
| B2 | Micro-lattice | 0.002101 | 473 |
| C1 | Block | 0.01458 | 457 |
| C2 | Block | 0.0107871 | 460 |
| D1 | Block | 0.003605 | 254 |
| D2 | Block | 0.0036048 | 266 |

Battery Assembly

The lithium-ion battery was assembled in a CR2032 coin cell (Wellcos Corp.) in an argon-filed Mbraun glove box. The printed silver micro-lattice was used as the anode, lithium foil as the cathode, and a commercial polypropylene/polyethylene/polypropylene (PP/PE/PP) membrane (Celgard, LLC) as a separator. The battery was filed with an electrolyte solution of 1 Molar (M) solution of lithium hexafluorophosphate ($LiFP_6$) in ethylene carbonate (EC): propylene carbonate (PC): ethyl methyl carbonate (EMC) (1:1:3 volume %) (Sigma-Aldrich).

Electrode Characterization and Electrochemical Measurements

The morphologies of the printed and sintered 3D electrodes were characterized using Scanning Electron Microscopy (SEM, Hitachi S4700). A Focused Ion Beam (FIB, FEI Corporation) cut was used to observe porosity within the truss members of the micro-lattice structure.

The electrochemical behavior of the assembled batteries (charge/discharge process) were measured from 0.02 to 2.8 volts (V) using an IVIUMnSTAT battery testing station (Ivium Technologies). The areal capacity was measured under different C-rates (0.1C, 0.2C, 0.5C, and 1C and again at 1C) for a total of 40 cycles. The areal capacity was calculated based on mass of silver and an experimental theoretic specific capacity of 290 milliampere hours per gram (mAh/g) (Jung, H.-R., et al. 2011 Ag/poly (3,4-ethylenedioxythiophene) nanocomposites as anode materials for lithium ion battery, *Solid State Ionics,* 187(1):50-57). Battery impedance was measured using electrochemical impedance spectroscopy (EIS) at 0.2 V open circle voltage.

Results

Microlattice Design and Architecture

The open octahedral micro-lattice geometry shown in FIG. 2A was selected to demonstrate the proposed invention. Each link or truss of the micro-lattice geometry is connected to three nearest and four other links at each end, while a given joint holds eight links together, reducing the risk of electronic disconnection due to stresses during the charge/discharge cycles. The geometrical feature which makes this octahedral lattice especially suitable for batteries is that it is an "open foam" structure. This open structure guarantees the free transport of the electrolyte and allows for uniform diffusion of the host ions on the anode surface (e.g., $Li^+$ in the case of Li-ion batteries), regardless of the link thicknesses and the overall sample volume. In addition, the unit cell in the lattice is not fully mechanically constrained, allowing for considerable electrode deformation. This deformation can be estimated by Maxwell's criterion of $M=-3j+b+6$, where M represents the number of modes, j represents the number of frictionless joints (6 joints for the structure of FIG. 2A), and b is the number of links (8 for the structure of FIG. 2A) (Ashby, M. 2016 The properties of foams and lattices, philosophical transactions of the royal society of London a: mathematical, *Phys. Eng. Sci.,* 364(1838):15-30). Accordingly, four soft modes of deformation can be expected based on the open octahedral structure. With a high number of soft modes for the lattice, the proposed structure can have a high strain tolerance, which mitigates the electrochemical stress when swelling occurs under charge/discharge cycles, and when compressive loads arise from the cell boundaries, such as casing.

Figure 2B:
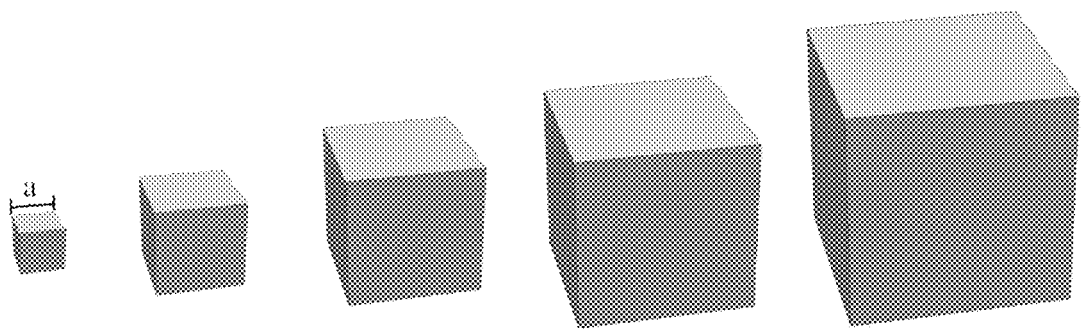
Figure 2C:
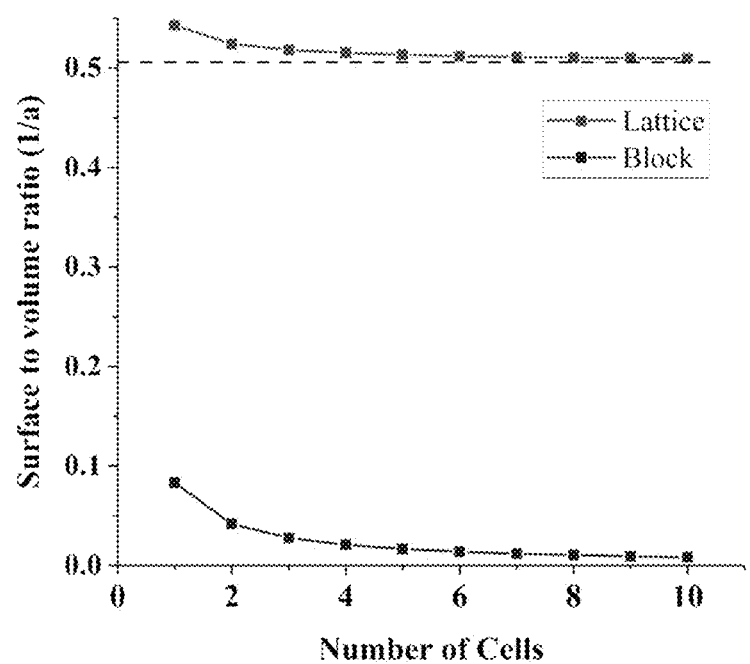

To elaborate on the effect of electrode material architecture on the increase in the surface area, the lattice geometry is compared with an equivalent dense block of active material (FIG. 2B). A high surface area to volume ratio can provide an enhanced transport for the intercalation process and allow for better material utilization. For a cube, the surface to volume ratio is inversely proportional to its edge length and becomes smaller as the cube size increases (FIG. 2C). The surface area to volume ratio for a cubic lattice structure remains constant as the number of cells (i.e. overall size) increases and is much higher than, up to 3.4 times more than the 5×5×5 design, of the cubes (Table 2).

TABLE 2

| Number of Cells | Surface Area Per Unit Volume Ratio (Micro-Lattice/Block) | Surface Area Per Unit Mass Ratio (Micro-Lattice/Block) |
| --- | --- | --- |
| 1 × 1 × 1 | 0.5 | 6.8 |
| 2 × 2 × 2 | 1.2 | 15.8 |
| 3 × 3 × 3 | 2.0 | 24.9 |
| 4 × 4 × 4 | 2.7 | 34.1 |
| 5 × 5 × 5 | 3.4 | 43.2 |
| 6 × 6 × 6 | 4.1 | 52.4 |
| 7 × 7 × 7 | 4.8 | 61.6 |
| 8 × 8 × 8 | 5.6 | 70.8 |

TABLE 2-continued

| Number of Cells | Surface Area Per Unit Volume Ratio (Micro-Lattice/Block) | Surface Area Per Unit Mass Ratio (Micro-Lattice/Block) |
| --- | --- | --- |
| 9 × 9 × 9 | 6.3 | 80.0 |
| 10 × 10 × 10 | 7.0 | 89.2 |

Figure 3:
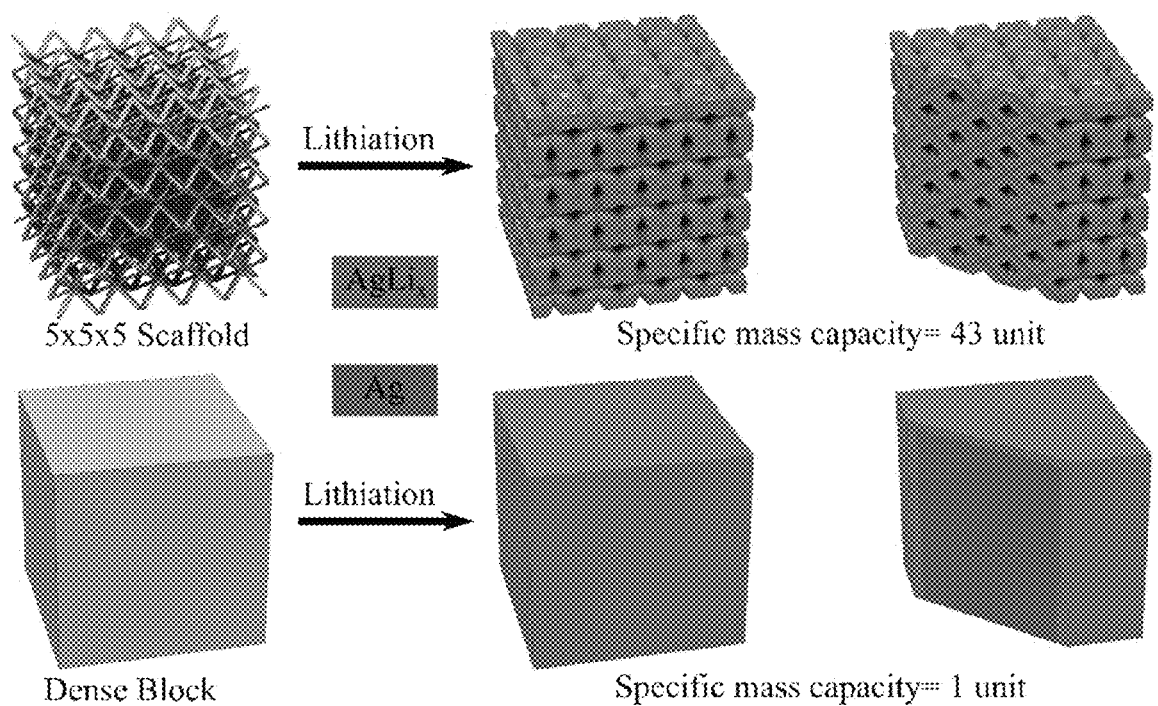
FIG. 3: Lattice architecture can provide channels for effective transportation of electrolyte inside the volume of material, while for the cube anode, most of the material will not be exposed to the electrolyte. The cross-section view shows the silver mesh enabling the charge ($Li^+$ ions) transportation to the current collector and how most of the printed material has been utilized.

Another aspect of battery technology is the battery areal capacity. One way to increase the areal capacity is to add more material by increasing the thickness of the electrodes. This approach, however, limits the transport of ions and electrons, resulting in poor power performance and inefficient utilization of materials. Although micro-architectures have less active material than solid blocks, they can result in effective utilization of the electrode volume and can increase specific capacity and areal capacity. Further, the porosity within the truss members of the micro-lattice can be adjusted so that hierarchical porosity can be achieved for effective stress relief. The schematic in FIG. 3 shows the lithiation for a 5×5×5 lattice and a dense block of equivalent overall size. The charge carrying capacity of the lattice electrodes is significantly higher than that for the block electrode for the same amount of charging time.

Fabrication of Three-Dimensional Micro-Lattice Electrodes

Figure 4A:
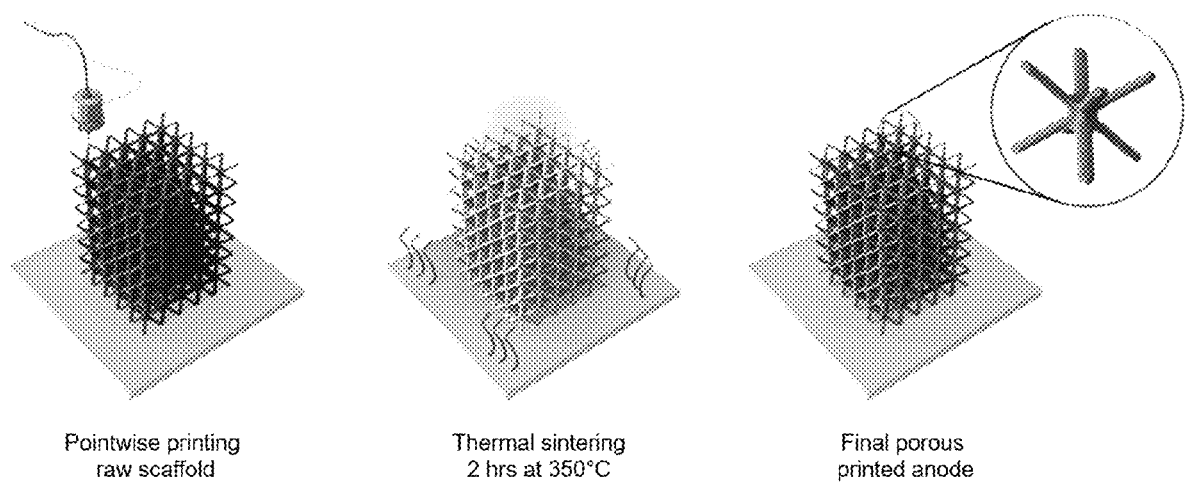
FIGS. 4A-4C.
Figure 4B:
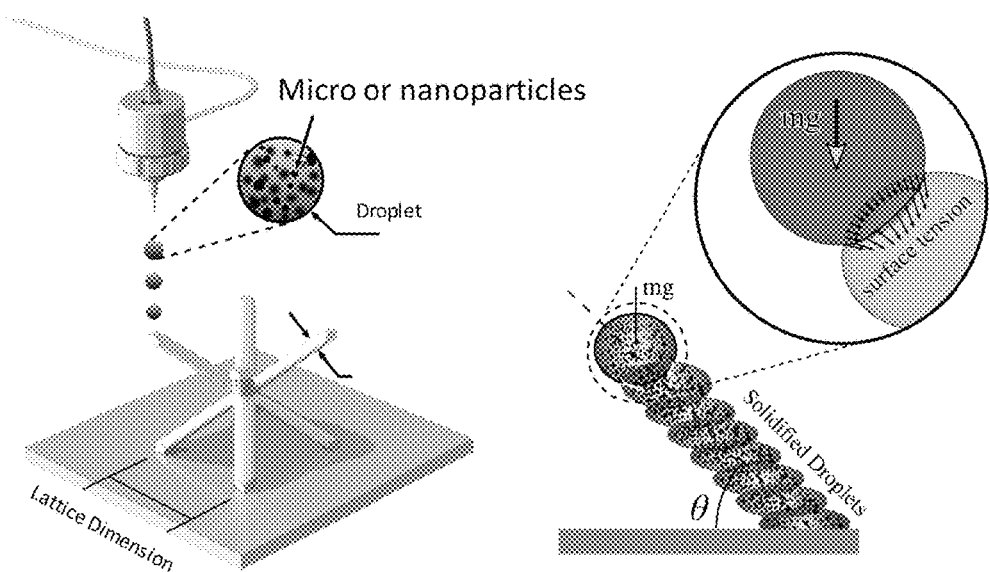

FIG. 4A illustrates the schematic of the printing and sintering process for the micro-lattice electrodes and resulting formation of the hierarchical porosity. Droplets containing Ag nanoparticles exit from the AJ nozzle with a diameter of approximately 1 μm to 5 μm and a particle loading of about 70% (Paulsen, J. A. et al. 2012 Future of Instrumentation International Workshop; Saleh, M. S., et al. 2017 *J. Appl. Phys.* 3(3):e1601986). Several of the droplets coalesce and form a mass of nanoparticles that reach the substrate. The next set of droplets are then dispensed at an offset as shown in FIG. 4B to facilitate adhesion to the previously formed droplet pillar. For successful adhesion, the surface forces of the droplets scale as $r^2$, while the inertia forces scale as $r^3$, where r is the radius of the droplet. This difference allowed strong adhesion forces for the droplet, as compared to its inertia forces, e.g., the weight, at droplet radius of 100 μm or less (Batchelor, G. K. 2000 An Introduction to Fluid Dynamics, Cambridge University Press). The heated platen removed the solvent from the droplets, to ready the pillar to receive the next droplet containing silver nanoparticles. This process was continued until a full lattice structure was formed.

Figure 4C:
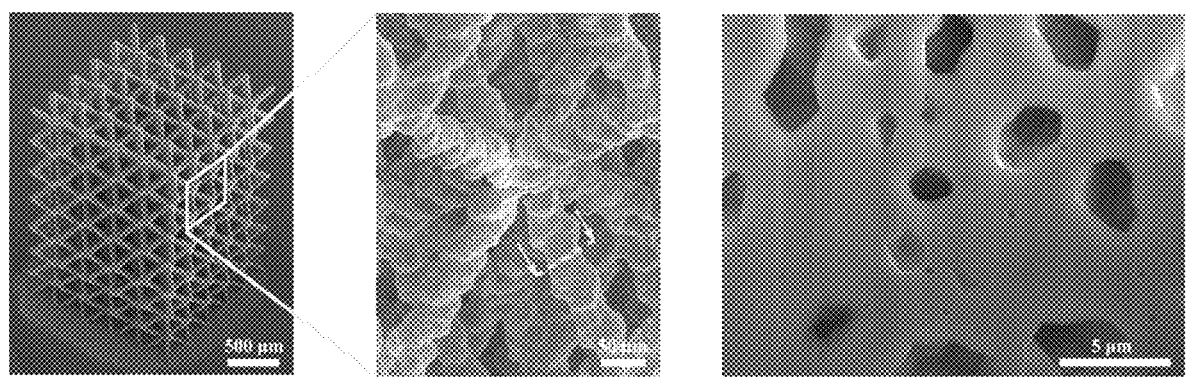

Sintering the completed micro-lattice structure removed the binders and sintered the nanoparticles to form metallic truss members with internal porosity. A printed micro-lattice electrode shown in FIG. 4C, where the complex lattice geometry, along with the porosity, at different length scales are observed. Printing produced controlled porosity at approximately 100 μm to 300 μm length scale (left image of FIG. 4A), while the smaller porosity at the 1 μm length scale is obtained from sintering the 3D lattice (center image of FIG. 4A, FIB section shown in the right image of FIG. 4C). The smaller porosity can be controlled from 0% to 30% for silver by varying the sintering temperature (see, e.g., Saleh, M. S., et al. 2018 Polycrystalline micropillars by a novel 3D printing method and their behavior under compressive loads, *Scr. Mater.,* 149:144-149). The porosity of FIG. 4C formed from the printed nanoparticles is at a length scale of hundreds of microns, giving rise to a hierarchical electrode porosity not observed in other systems.

Figure 5A:
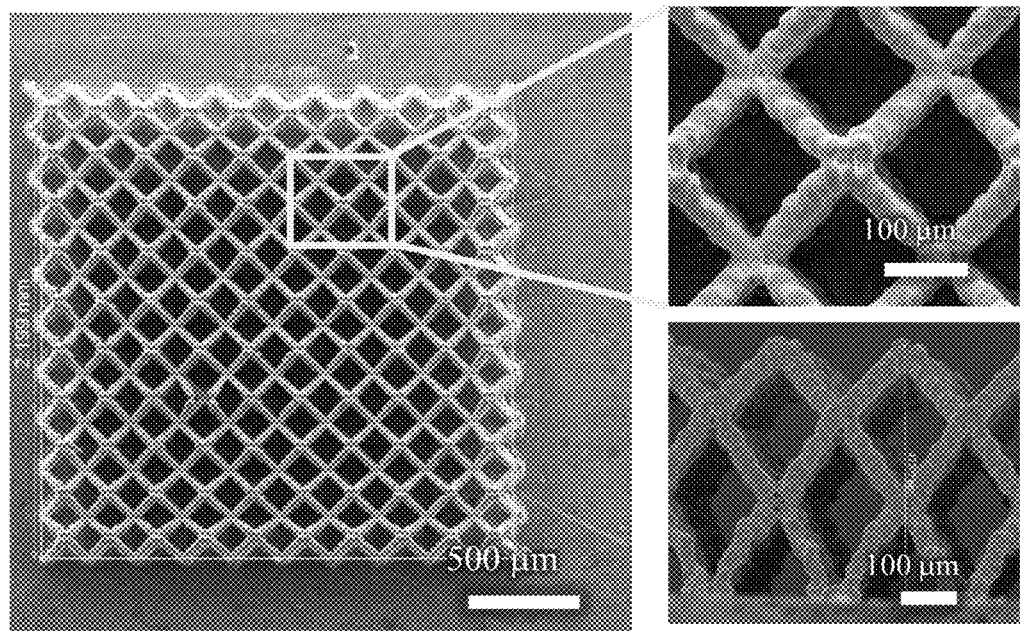
FIGS. 5A-5C: SEM Images of 3D printed electrodes for Li-ion batteries used for electrochemical cycling in this study.
Figure 5B:
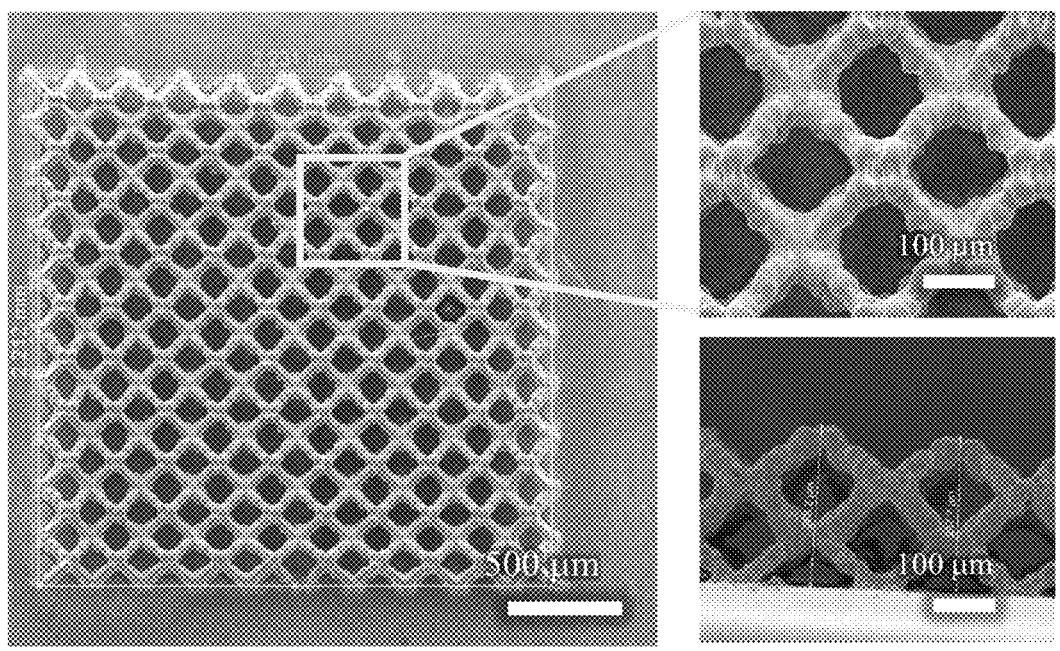
Figure 5C:
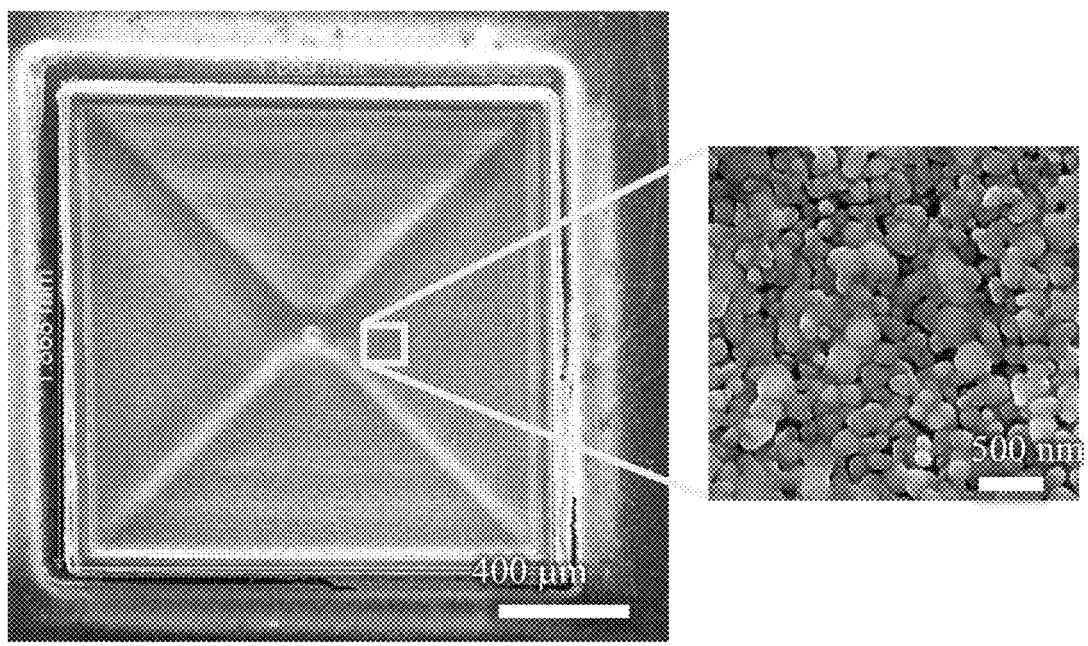

FIGS. 5A and 5B show top and side images of printed lattice electrodes with heights of about 450 µm and 250 µm, respectfully, at different magnifications. FIG. 5C shows a solid block of Ag, with approximately the same overall dimensions as FIG. 5A, AJ printed for comparison. A similar electrode with the same dimensions as FIG. 5B was also printed in the solid-block form and used for comparison (not shown). The higher magnification image of the solid-block showed a surface texture of the order of 100 nm to 500 nm. From FIGS. 4C, 5A, and 5B, it was observed that the AJ printing method produced a highly-controlled micro-lattice structures made of sintered nanoparticles. Hierarchical porosities of the resulting printed electrode ranged from hundreds of microns to a few microns or less within the solid truss members that form the lattice.

Electrochemical Performance

Figure 6A:
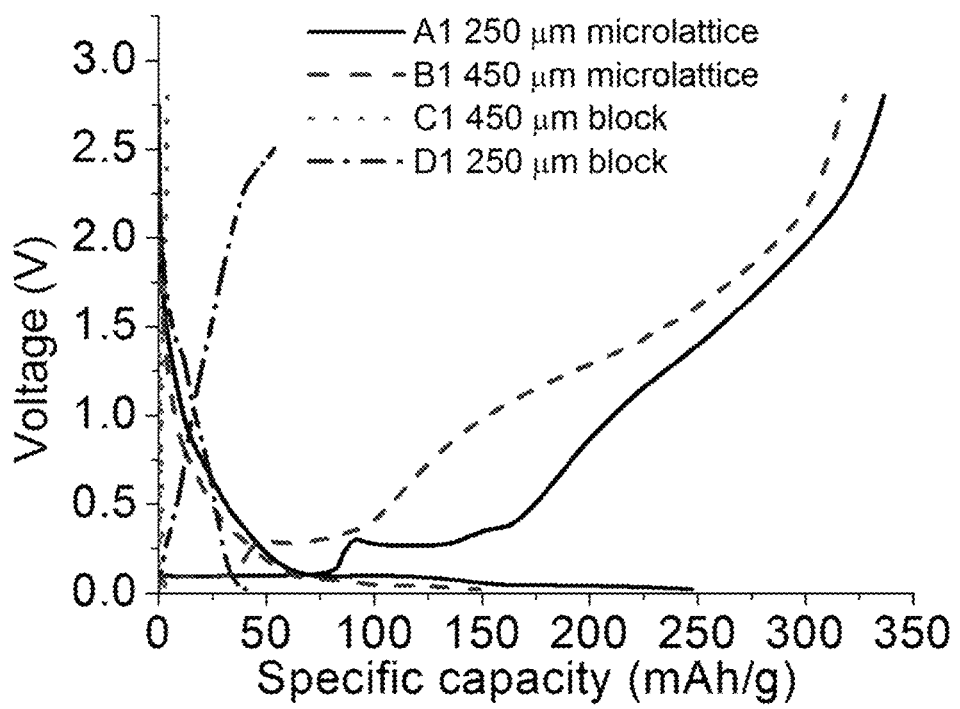
FIGS. 6A-6B.
Figure 6B:
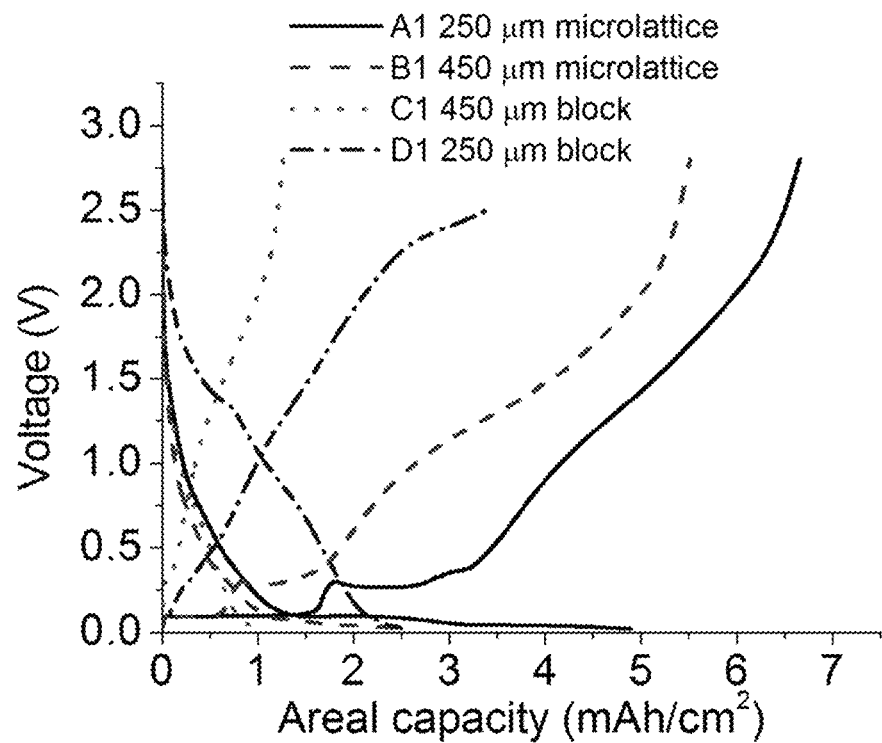

The comparison between the electrochemical performance of the silver micro-lattice (samples A1 and B1) and block samples (samples C1 and D1) in terms of specific capacity and aerial capacity can be found in FIGS. 6A and 6B, respectively. The micro-lattice samples have improved specific capacity performance (FIG. 6A), up to four times that of the block samples, and close to the highest reported silver specific capacity of 290 mAh/g. The lattice sample A1 achieved an areal capacity of 5 mAh/cm$^2$ in the first cycle (FIG. 6B), which is double the areal capacity of the block sample. Comparing samples with the same structure (A1 versus B1 or C1 versus D1) in FIG. 6B, it was observed that thinner electrodes have a better areal capacity at least during the initial cycles, although, lattice structures at both the thicknesses could improve both the areal and specific capacity. The lattice electrodes had a high utilization of the active material with much thicker electrodes, which indicated a higher areal capacity than reported values (Jung, H.-R., et al. 2011 *Solid State Ionics*, 187(1):50-57), and a power density of 22 micro Watts per square millimeter (µW/mm$^2$). The achieved power density compares well with the current state of the art batteries (Sun, K., et al. 2013, *Adv. Mater.*, 25(33):4539-4543).

Figure 7A:
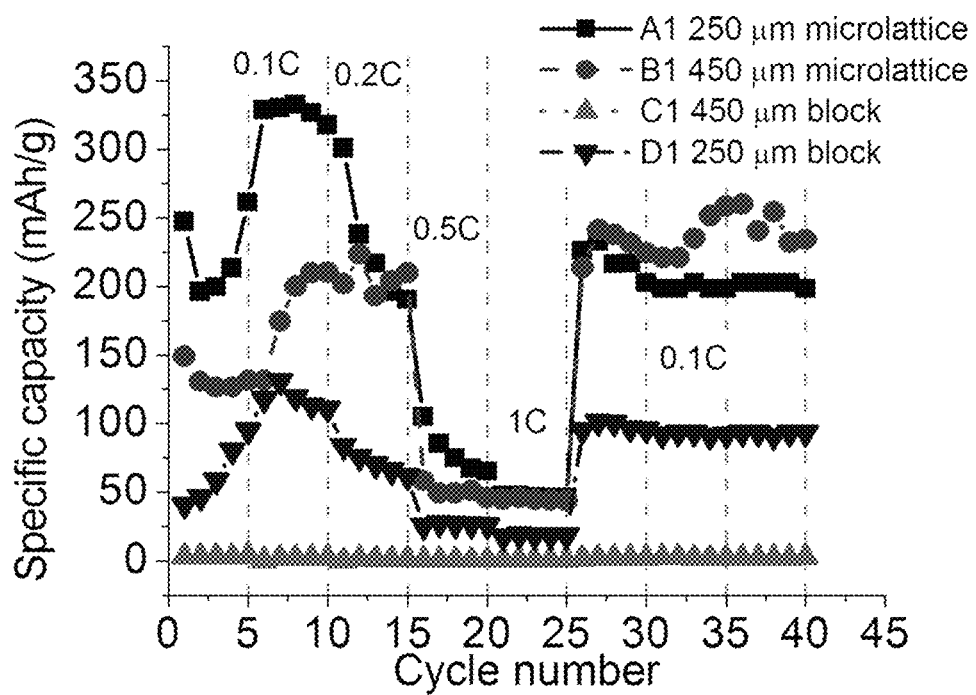
FIGS. 7A-7C.
Figure 7B:
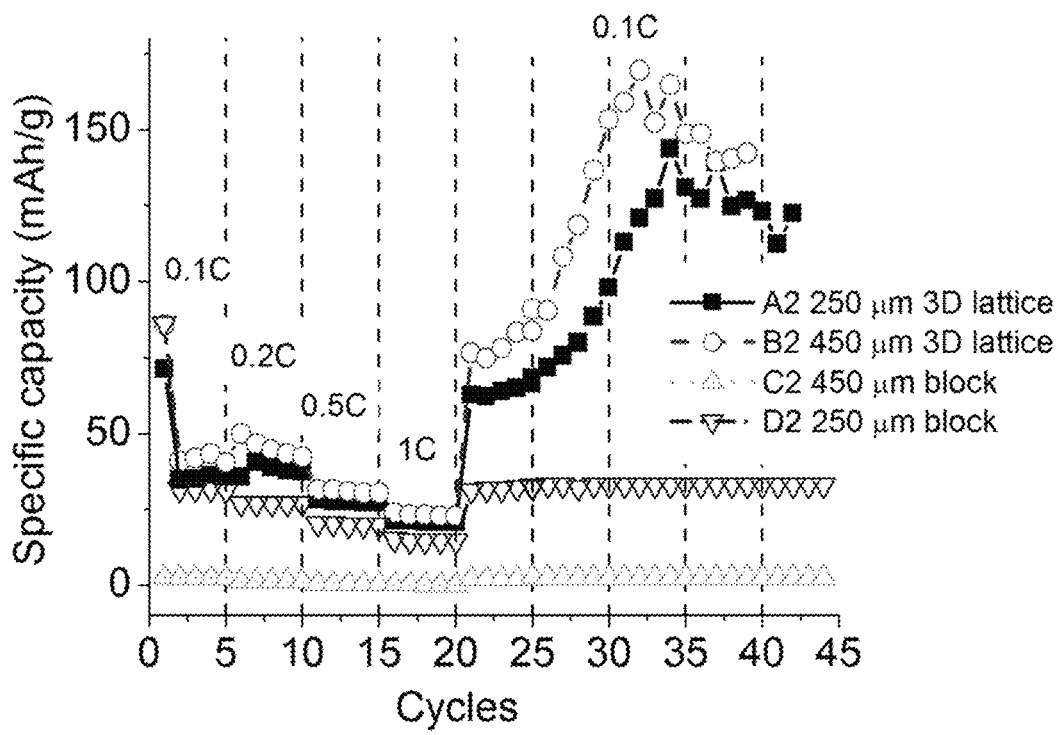
Figure 7C:
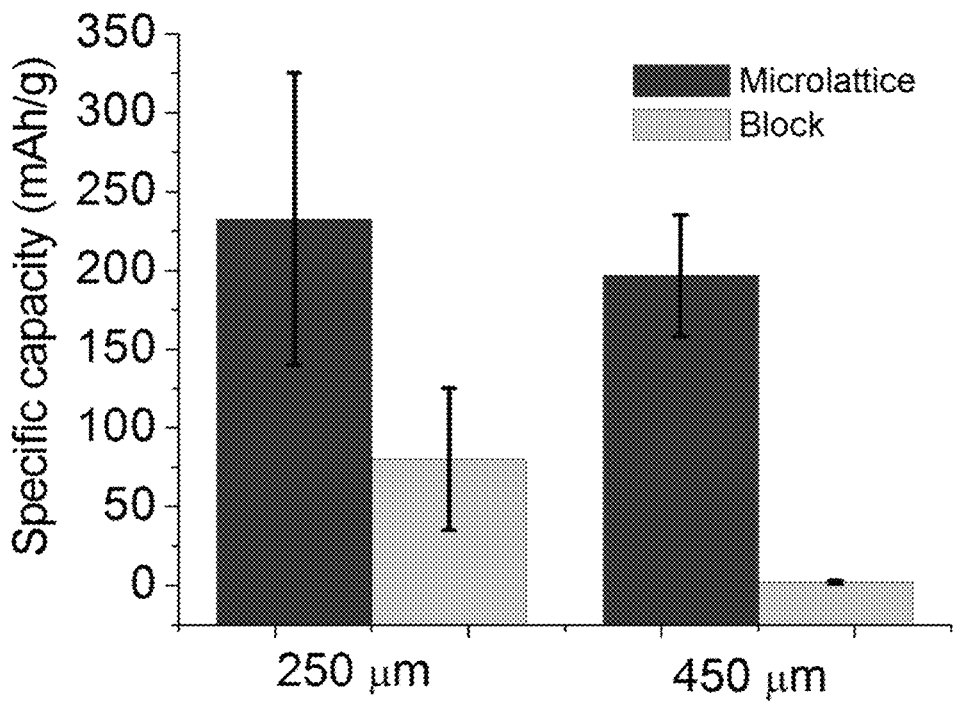

FIG. 7A illustrates the cycle and rate performance of the cells. The first five to seven cycles at 0.1C were considered to be formation cycles. During formation cycles, the specific capacity of the battery increases due progressively improved wetting of the electrode by the electrolyte until reaching equilibrium. The performance of the batteries stabilized beyond the initial formation cycles at the given C-rate. The lattice samples (A1 and B1) showed higher specific capacities at every C-rate when compared to the block samples (C1 and D1). After cycling, the lattice samples (A1 and B1) showed a good stabilized specific capacity of approximately 210 mAh/g, as a result of the 3D structure facilitating electrolyte transport throughout the electrode volume. The block samples (C1 and D1) showed poor specific capacities, resulting from the poor utilization of the active materials within the structure. Block sample D1 had a stabilized specific capacity of 95 mAh/g and block sample C1 exhibited poor performance with a specific capacity of 22 mAh/g. The specific capacity of samples A2, B2, C2, and D2 (Table 1) as a function of electrochemical cycling (FIG. 7B) followed a similar trend as samples A1, B1, C1, and D1 in FIG. 6A. FIG. 7C compares the average specific capacity for the electrode structures after the formation cycles. Despite some variation depending on samples, which could result from different material batches, it was observed that the micro-lattice electrode structures enhance the battery performance when compared to the block structures.

The thick, block electrodes showed a considerable reduction in capacity (80% loss) compared to the thin electrodes, likely due to the lower electrode utilization at a given time. The specific capacity of the thick 3D lattice electrode was reduced by about 10% in the initial cycles. However, beyond about ten cycles, the specific capacity of the thicker lattice sample is comparable, or even slightly higher than the thinner lattice sample. Adding more material by increasing the thickness of electrodes is a common method to increase the mass loading of the electrode, but limits the transport of ions and electrons, resulting in poor power performance and inefficient utilization of electrode material near the electrode-current collector interface. The 3D structure of the micro-lattice is expected to facilitate transport of ions via a shorter diffusion path with an enhanced electrochemical reaction through a larger interface surface area. FIG. 7A confirmed this hypothesis and as it indicated that the micro-lattice structure was able to maintain the specific capacity and hence scale the total capacity with increasing thickness of the electrodes.

Figure 8:
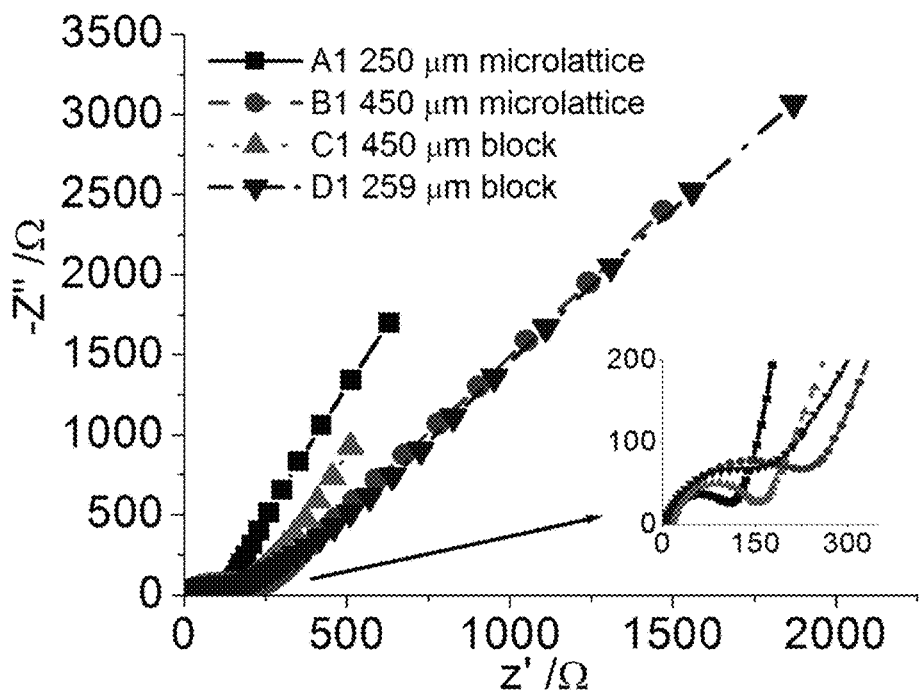
FIG. 8: Impedance of block and micro-lattice samples and the Nyquist plots for samples A1, B1, C1 and D1.

An EIS test was conducted on the micro-lattice and block samples to further understand the effect of the lattice structure on the battery performance. The Nyquist plots for the A1, B1, C1 and D1 samples are shown in FIG. 8. The original data was fitted by a circuit diagram model of $R_e(C_{sl}R_{sl})(C_{dl}R_{ct}Z_w)$. The high-frequency intercept at the Z axis corresponded to the ohmic resistance ($R_e$), which represented the resistance of the electrolyte, and the semicircle in the middle-frequency range indicates the charge transfer resistance ($R_{ct}$). The Warburg impedance, $Z_w$, which is related to a combined effect of the diffusion of lithium ions on the electrode/electrolyte interfaces, corresponded to the straight sloping line at the low-frequency end. Both cells had a similar (10Ω to approximately 20Ω) ohmic resistance, but the semicircle of the A1 micro-lattice structure was smaller than that of other structures. From the fitted impedance parameters, the $R_{ct}$ of the A1 sample ($R_{ct} \approx 86Ω$) indicated that inserting and de-inserting lithium ions for the micro-lattice structures was easier than for the other structures. This result showed that the micro-lattice electrode enhanced the transport of lithium ions, in confirmation of the results discussed in FIGS. 6A, 6B, 7A, 7B, and 7C.

Mechanical Integrity

Figure 9A:
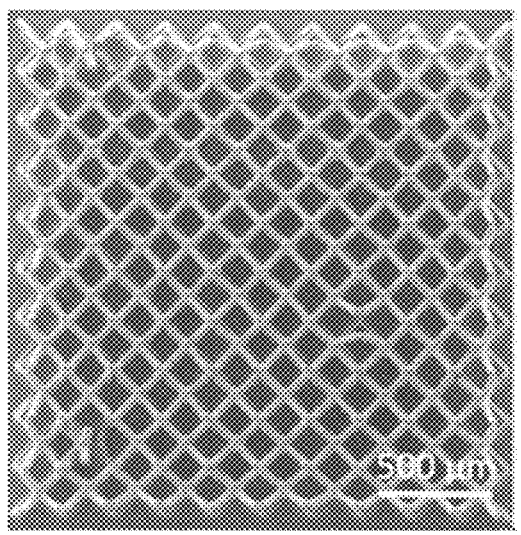
FIGS. 9A-9J.
Figure 9B:
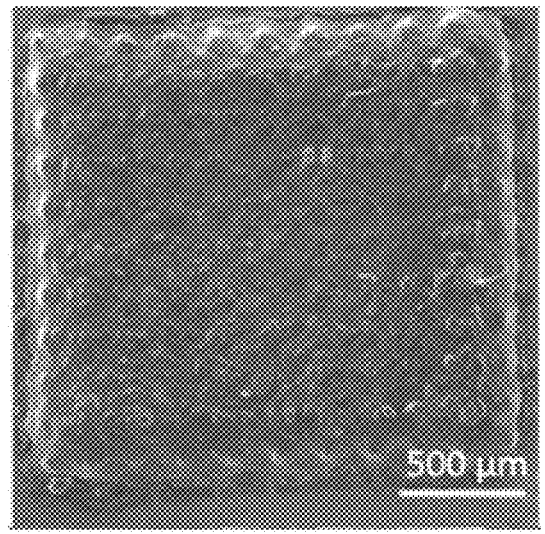
Figure 9C:
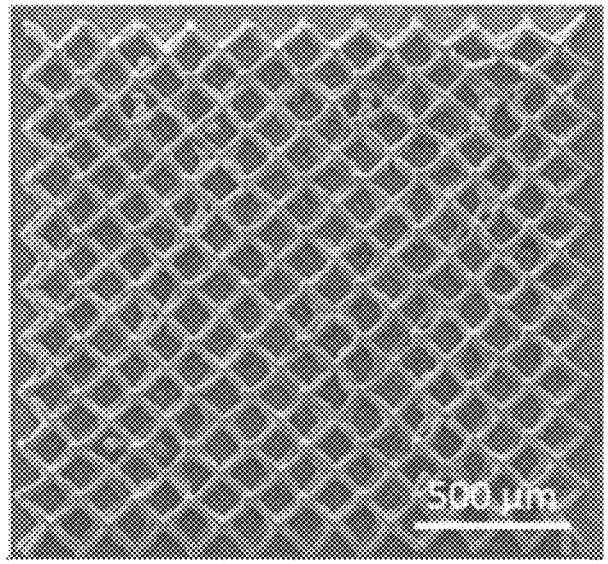
Figure 9D:
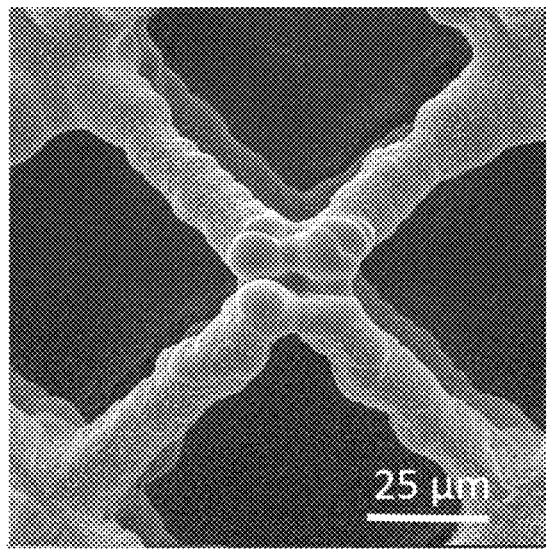
Figure 9E:
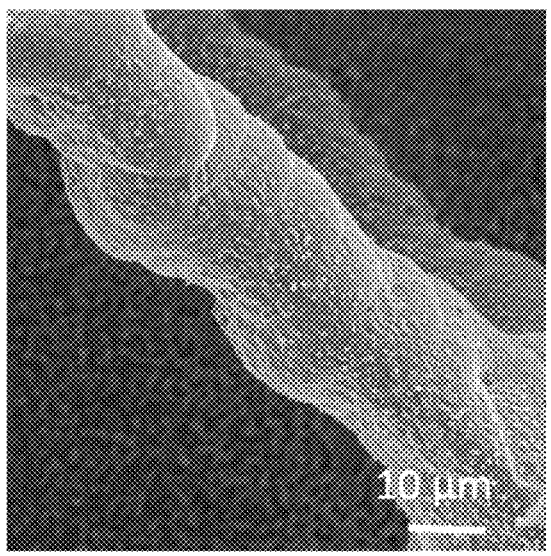
Figure 9F:
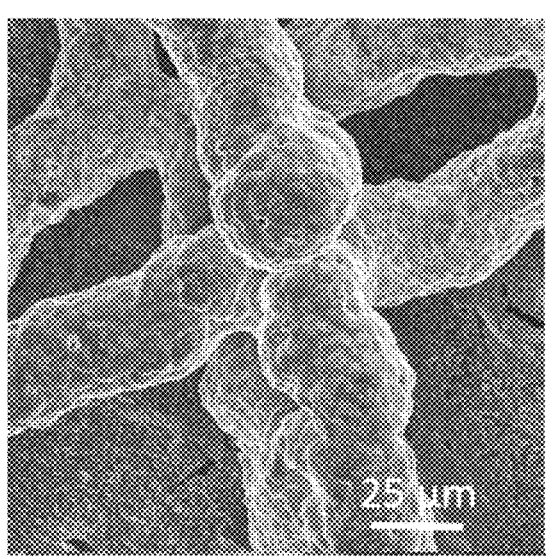
Figure 9G:
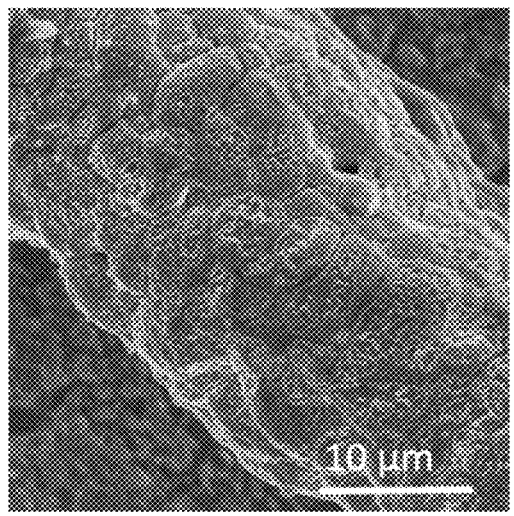
Figure 9H:
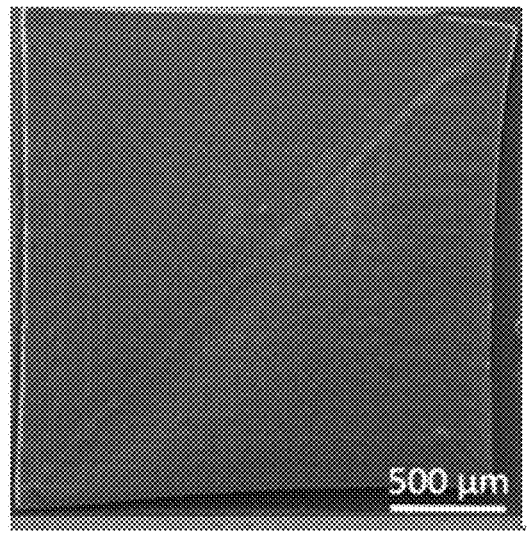
Figure 9I:
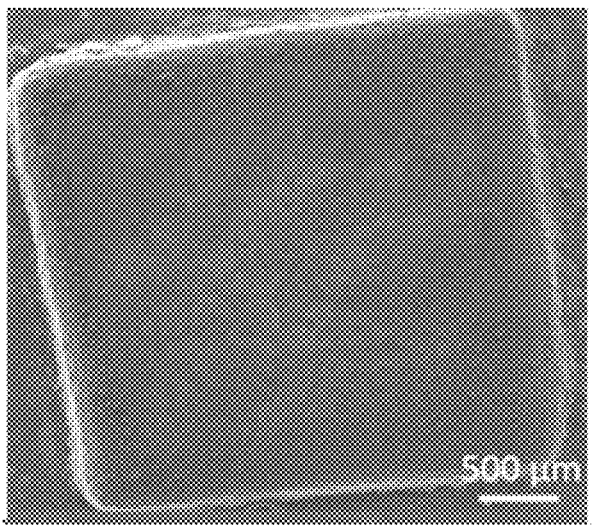
Figure 9J:
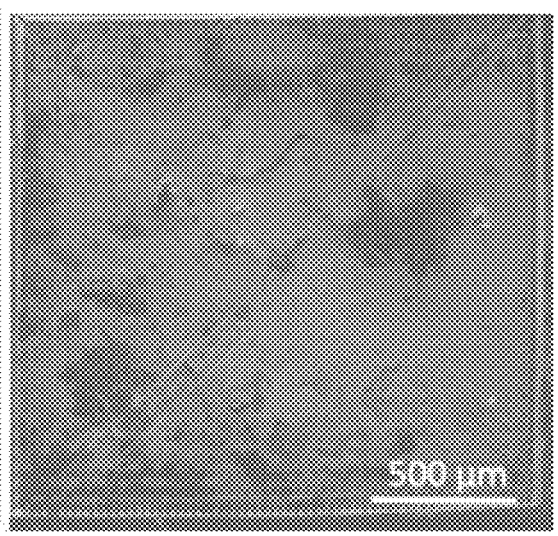

Silver materials are considered limited in their use as battery active materials due to their large volumetric expansion during lithium insertion (Fu, L., et al. 2013 Freestanding Ag/C coaxial hybrid electrodes as anodes for Li-ion batteries, *Nanoscale*, 5(23):11568-11571). SEM images were collected of micro-lattice structures for 250 µm thick 3D silver electrodes in as-fabricated, lithiated, and fully de-lithiated states after 40 cycles and are shown in FIGS. 9A, 9B, and 9C, respectively. After intercalation with lithium ions, the structures changed considerably but retained their overall shape. Lattice structures are reported to have high stress localization and fracture around nodes when loaded in compression (Chen, Y., et al. 2018 3D printed hierarchical honeycombs with shape integrity under large compressive deformations, *Mater. Des.*, 137:226-234). To assess the specific changes to the morphology, high magnification images of the as-fabricated and de-lithiated electrodes of FIG. 9A were collected and are shown in FIGS. 9D and 9E. The as-fabricated and de-lithiated electrodes of FIG. 9C at higher magnifications are shown in FIGS. 9F and 9G. The individual truss members increased in size by about 15% to 20% after the lithium intercalation/de-intecalation cycles (e.g., diameter of the truss element changes from 22 µm to 25 µm by comparing FIGS. 9D and 9F). The lithiation cycle gave the electrode a 'corrosion' like surface texture along with several cracks, likely an effect of the electrochemical processes and volumetric changes to the electrode. During the cycling process, the pores inside the micro-lattice were likely occupied with $AgLi_x$. To assess the specific changes, images of the as-fabricated, fully lithiated, fully and de-lithiated solid silver block electrodes were collected at higher magnifications and are shown in FIGS. 9H, 9I, and 9J.

A highly complex and controlled 3D micro-lattice architecture battery electrode with hierarchical porosity was successfully fabricated using an AJ 3D printing method. Micro-lattice electrodes with porous solid silver truss members had an improvement in battery performance, such as a 400% increase in specific capacity, 100% increase in areal capacity, and high electrode volume utilization, as compared to a typical thin solid silver block electrode. The micro-lattice electrodes retained their morphologies after forty electrochemical cycles, demonstrating mechanical robustness. The 3D micro-lattice structure with a hierarchical porosity enhanced electrolyte transport through the electrode volume, increased the available surface area for electrochemical reactions, and relieved the intercalation-induced stress, leading to a robust, high capacity battery system.

Example 2

A 3D electrochemical model was developed for the evaluation of electrodes with arbitrary 3D geometry. This model was based on the Pseudo 2D (P2D) model (in general), in which an electrode sketch was incorporated and meshed by the finite element method. A fourth order approximate analytic solution of solid-phase diffusion equation was utilized to simplify the evaluation of lithium ion concentration in the solid phase. Pore structure and 3D geometry of electrode were treated as a different scale, wherein the pore structure was regarded as a homogenized system superimposed of electrode and electrolyte, and the 3D geometry was simulated as being composed of individual solid and liquid phases. The simulation by the 3D electrochemical model was validated by experimental data. The model was then used to evaluate the electrochemical performance of different electrode geometries, different thicknesses, and different geometry parameters.

Materials and Methods

Electrode Materials, Design and Architecture, Battery Assembly, Electrode Characterization and Electrochemical Methods Micro-lattice and block electrodes for electrochemical model validation were printed using the same materials, printing method, and design as in Example 1. The battery was assembled as described in Example 1, which contained the printed Ag nanoparticle electrode as the anode, a PP/PE/PE membrane separator, 1 M $LiFP_6$ EC:PC:EMC 1:1:3 as the electrolyte, and lithium foil as the cathode. The charge/discharge process was conducted from 0.02 V to 2.8 V using the IVIUMnSTAT battery test station.

Electrochemical Model

Figure 10A:
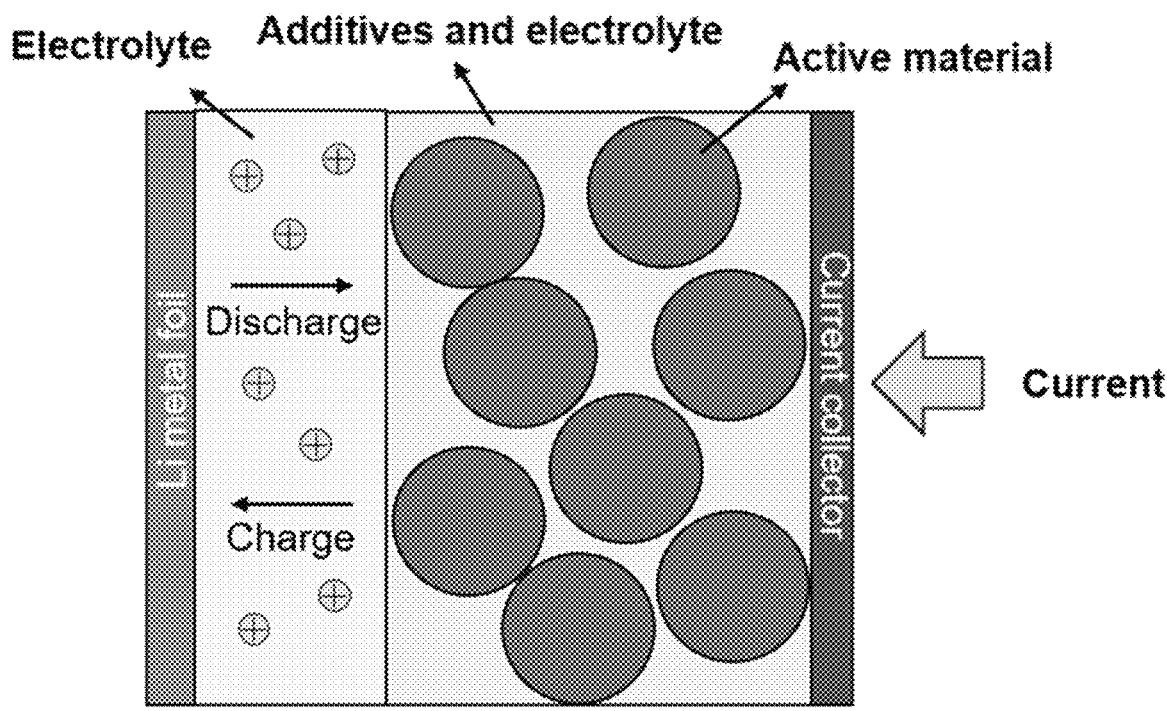
FIGS. 10A-10B.
Figure 10B:
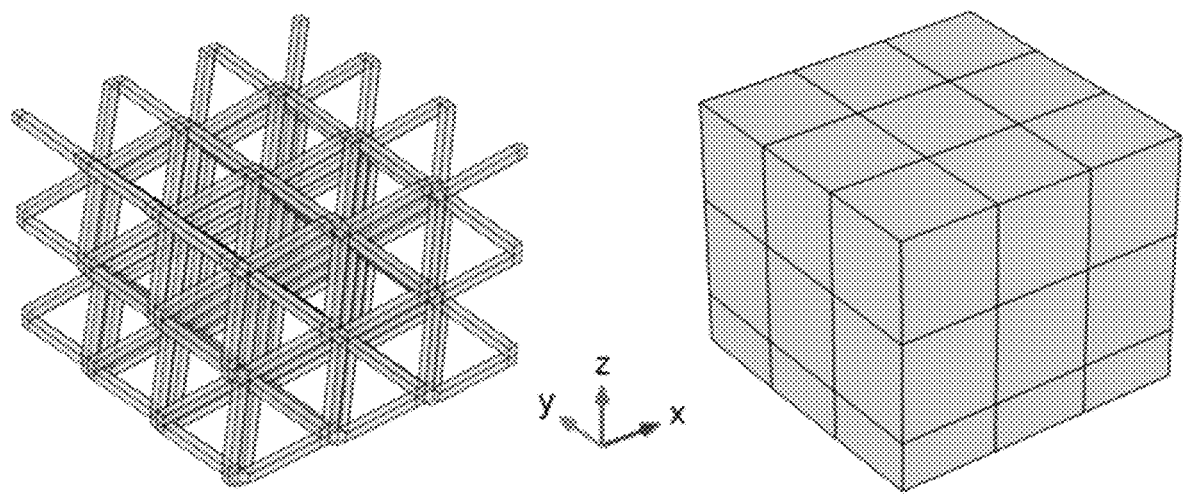

To incorporate the 3D geometry of the electrode in modeling, a half-cell model was developed, as shown in FIG. 10A. The mass conversion and charge conservation equations were evaluated in a 3D electrode as shown in FIG. 10B, according to porous electrode theory.

The governing equation of mass balance in a solid phase was given by Fick's law (Equation 1):

$$\frac{\partial c_{s,j}(r,t)}{\partial t} = \frac{D_{s,j}}{r^2}\frac{\partial}{\partial r}\left(r^2 \frac{\partial c_{s,j}(r,t)}{\partial r}\right), \quad (1)$$

in which $c_{s,j}$ was the lithium ion concentration in solid phase, t was time, r was the radius direction coordinate, $D_{s,j}$ was the lithium ion diffusion coefficient in solid phase, and j=p or n for a positive or negative electrode. The boundary condition for Equation 1 was:

$$D_{s,j}\frac{\partial c_{s,j}(t)}{\partial r}\bigg|_{r=0} = 0 \text{ and } D_{s,j}\frac{\partial c_{s,j}(t)}{\partial r}\bigg|_{r=R_j} = -J_j(t), \quad (2)$$

where $R_j$ was the particle radius and $J_j$ was the lithium ion molar flux of lithium ion on the active material surface.

To simplify the calculation of lithium ion concentration in the solid phase, a fourth order polynomial approximation solution was adopted to reduce the computation cost (Subramanian, V. R., et al. 2005 Efficient macro-micro scale coupled modeling of batteries, *Journal of The Electrochemical Society*, 152(10):A2002-A2008). The concentration profile was expressed as:

$$c_{s,j}(r,t) = a(t) + b(t)\left(\frac{r^2}{R_j^2}\right) + c(t)\left(\frac{r^4}{R_j^4}\right). \quad (3)$$

By substituting Equation 3 into Equation 1, the constant coefficients a(t), b(t), and c(t) were solved in terms of volume-averaged concentration $c_{s,j,avg}$, surface concentration $C_{s,j,surf}$, and volume-averaged concentration flux $q_{s,j,avg}$ as $$a(t) = \frac{39}{4}c_{s,j,surf}(t) - 3R_j q_{s,j,avg}(t) - \frac{35}{4}c_{s,j,avg}(t), \quad (4)$$

$$b(t) = -35c_{s,j,surf}(t) + 10R_j q_{s,s,avg}(t) + 35c_{s,j,avg}(t), \text{ and} \quad (5)$$

$$c(t) = \frac{105}{4}c_{s,j,surf}(t) - 7R_j q_{s,s,avg}(t) - \frac{105}{4}c_{s,j,avg}(t). \quad (6)$$

The three equations to solve $c_{s,j,avg}$, $c_{s,j,surf}$ and $q_{s,j,avg}$ were obtained by volume averaging Equation 1 and evaluating the boundary condition at $R_p$, respectively, and as presented below:

$$\frac{dc_{s,p,avg}(X,t)}{dt} = -\frac{J_p(X,t)}{3R_p}, \quad (7)$$

$$\frac{dq_{s,p,avg}(X,t)}{dt} = -30\frac{D_{s,p}}{R_p^2}q_{s,p,avg}(X,t) - \frac{45}{2R_p^2}J_p(x,t), \text{ and} \quad (8)$$

$$c_{s,p,surf}(X,t) = c_{s,p,avg}(X,t) + \frac{8R_p}{35}q_{s,p,avg}(X,t) - \frac{R_p}{35D_{s,p}}J_p(X,t), \quad (9)$$

where X was the coordinate in the 3D electrode.

The lithium ion flux was given by the Bulter-Vomer equation:

$$J_p(X, t) = k_p c_{s,p,max} c_e^{0.5}\left(1 - \frac{c_{s,p,surf}(X, t)}{c_{s,p,max}}\right)^{0.5}\left(\frac{c_{s,p,surf}(X, t)}{c_{s,p,max}}\right)^{0.5} \times \quad (10)$$
$$\left\{\exp\left(\frac{0.5F}{RT}\eta_p(X, t)\right) - \exp\left(-\frac{0.5F}{RT}\eta_p(X, t)\right)\right\} \text{ and}$$

$$J_{Li}(t) = 0.85\left\{\exp\left(-\frac{0.5F}{RT}\Phi_{e,s}(X, t)\right) - \exp\left(\frac{0.5F}{RT}\Phi_{e,s}(X, t)\right)\right\}, \quad (11)$$

where $k_p$ was the reaction rate constant, $c_{s,p,max}$ was the maximum lithium ion concentration of cathode material, $c_e$ was the electrolyte concentration, R was the gas constant, T was the ambient temperature, and $n_j$ was the overpotential defined as $\eta_p = \phi_{s,p} - \phi_{e,p} - U_p$, where $\phi_{s,p}$ was the solid-phase potential, $\phi_{e,p}$ was the electrolyte-phase potential, and $U_p$ was the open-circuit potential.

The mass conservation in the liquid phase is given by:

$$\epsilon_k \frac{\partial c_{e,j}(X, t)}{\partial t} = \frac{\partial}{\partial X}\left(D_{eff,k} \frac{\partial c_{e,k}(X, t)}{\partial X}\right) + a_k(1 - t_+)J_k(X, t), \quad (12)$$

where k=p/s for the cathode and separator, respectively, and $J_s(X,t)=0$. $\epsilon_k$ was the liquid-phase volume fraction, $D_{eff,k}$ was the effective diffusion coefficient, $a_k$ was the specific surface area of electrode, and $t_+$ was the transference number in the electrolyte. The $D_{eff,k}$ was calculated by $D_{eff,k}=D_k(\epsilon_k)^{brug}$, where brug is the Bruggman coefficient.

The boundary conditions at the current collector for Equation 12 were $$-D_{eff,p}\frac{\partial c_{e,p}(t)}{\partial X}\bigg|_{x=0} = 0 \text{ and} \quad (13)$$

$$-D_{eff,s}\frac{\partial c_{e,s}(t)}{\partial X}\bigg|_{x=L_p+L_s} = \frac{J_{Li}(t)}{F}, \quad (14)$$

in which $L_p$ was the cathode thickness and $L_s$ was the separator thickness.

The boundary conditions at the electrode/separator interface for Equation 12 were expressed as:

$$-D_{eff,p}\frac{\partial c_{e,p}(t)}{\partial X}\bigg|_{x=L_p} = -D_{eff,s}\frac{\partial c_{e,s}(t)}{\partial X}\bigg|_{x=L_p} \quad (15)$$

$$c_{e,p}(t)|_{x=L_p} = c_{e,s}(t)|_{x=L_p} \quad (16)$$

where the initial condition for Equation 12 was:
The specific surface area, $a_p$, was defined as $$a_p = \frac{3(1 - \epsilon_p)}{R_p}. \quad (18)$$

Charge conservation in the solid-phase of the electrode was written based on Ohm's law $$\sigma_{eff,j}\frac{\partial^2 \Phi_{s,j}(X, t)}{\partial X^2} = a_j F J_j(X, t). \quad (19)$$

The boundary condition at the current collector was defined as:

$$-\sigma_{eff,p}\frac{\partial \Phi_{s,p}(t)}{\partial X}\bigg|_{x=0} = I \text{ and} \quad (20)$$

$$-\sigma_{eff,p}\frac{\partial \Phi_{s,p}(t)}{\partial X}\bigg|_{x=L_p} = 0, \quad (21)$$

where the current density $I = i_{app}/A$, $i_{app}$ was applied current, A was the electrode foot area. $k_{eff,k}$ was the effective conductivity as a function of electrolyte concentration $k_{eff,k} = k_j (\epsilon_j)^{0.5}$.

The governing equation of charge conservation in the liquid phase can be described by Equation 22, $$k_{eff,k}\frac{\partial^2 \Phi_{e,k}(X, t)}{\partial X^2} - \frac{2k_{eff,k}RT(1-t_+)\partial^2 \ln c_{e,k}(X, t)}{F\partial X^2}\left(1 + \frac{d\ln f_+}{d\ln c_{e,k}}\right) = I, \quad (22)$$

where $\phi_{e,k}$ was set as 0 at the cathode/current collector interface. Other boundary conditions of liquid phase potential are:

$$k_{eff,k}\frac{\partial \Phi_{e,k}(X, t)}{\partial X} - \frac{2k_{eff,k}RT(1-t_+)\partial \ln c_{e,k}(X, t)}{F\partial X}\left(1 + \frac{d\ln f_+}{d\ln c_{e,k}}\right)\bigg|_{x=0} = 0, \quad (23)$$

$$k_{eff,k}\frac{\partial \Phi_{e,k}(X, t)}{\partial X} - \frac{2k_{eff,k}RT(1-t_+)\partial \ln c_{e,k}(X, t)}{F\partial X} \quad (24)$$
$$\left(1 + \frac{d\ln f_+}{d\ln c_{e,k}}\right)\bigg|_{x=L_p+L_s} = J_{Li}(t), \text{ and}$$

$$-k_{eff,p}\frac{\partial \Phi_{e,p}(t)}{\partial X}\bigg|_{x=L_p} = -k_{eff,s}\frac{\partial \Phi_{e,s}(t)}{\partial X}\bigg|_{x=L_p}. \quad (25)$$

COMSOL 5.4 was used to implement all the governing equations above into the finite element method to simulate the electrochemical behavior within the 3D electrode of FIG. 10B. The material parameters used in the simulation are listed in Table 3.

TABLE 3

| Parameter | Value | Description |
| --- | --- | --- |
| brug | 1.5 | Bruggeman coefficient |
| $C_{e,k,0}$ | 2000 | Initial electrolyte concentration (mol m$^{-3}$) |
| $C_{max, pos}$ | 84000 | Positive maximum concentration (mol m$^{-3}$) |
| $D_e$ | 7.5 × 10$^{-11}$ | Diffusion coefficient in electrolyte (m$^2$s$^{-1}$) |
| $D_{s,p}$ | 2.5 × 10$^{-15}$ | Solid-phase Li diffusivity, positive electrode (m$^2$s$^{-1}$) |
| F | 96487 | Faraday's constant (C mol$^{-1}$) |
| $i_o$ | 0.85 | Constant flux for half-cell |
| I | Variable | Applied current density (A m$^{-2}$) |
| $k_{s,p}$ | 3.8 | Solid phase conductivity (S m$^{-1}$) |
| $k_p$ | 2 × 10$^{-6}$ | Reaction rate coefficient, cathode (m$^{2.5}$mol$^{-0.5}$s$^{-1}$) |

TABLE 3-continued

| Parameter | Value | Description |
|---|---|---|
| R | 8.314 | Universal gas constant (J mol$^{-1}$K$^{-1}$) |
| $R_p$ | 13 × 10$^{-6}$ | Particle radius, positive electrode (m) |
| $t_+$ | 0.363 | Cationic transport number |
| $\varepsilon_p$ | 0.24 | Positive electrode porosity |
| $\varepsilon_s$ | 1 | Separator porosity |

Results/Discussion

Experimental Results: Electrochemical Performance

Figure 11:
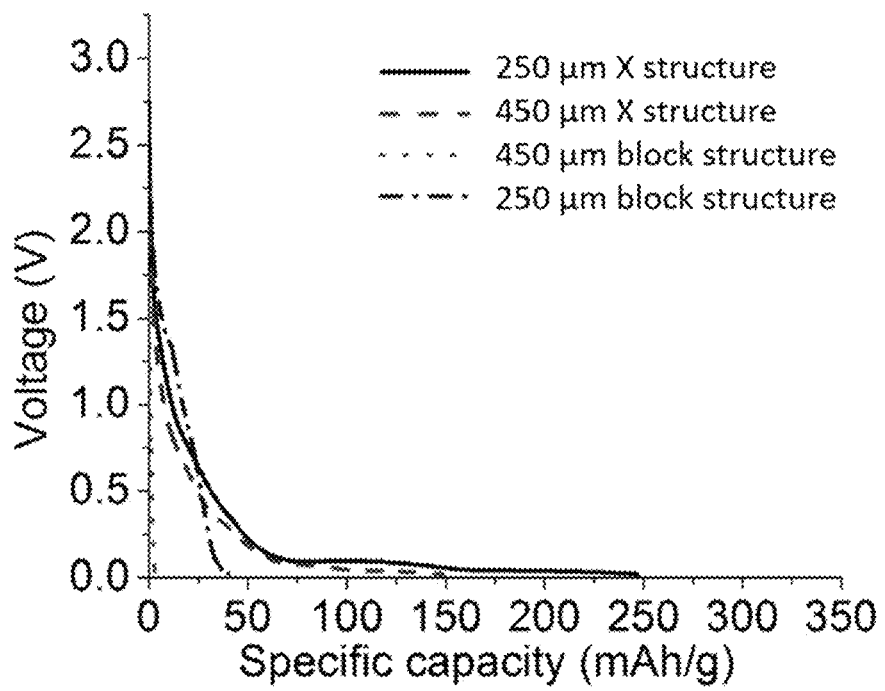
FIG. 11: The specific capacity as a function of voltage for the micro-lattice and block structures with a thickness of about 250 μm and 450 μm.

FIG. 11 shows the experimental results of the discharge of the micro-lattice and block structured electrodes with different thickness. Thin electrodes of both the micro-lattice and block structures occupy a higher capacity, as compared to the thick electrodes. This result is a result of the limited transportability of species and poor material utilization within the thick electrodes. Comparing the specific capacity of different structured electrodes with same thicknesses, it can be seen that even at a 450 µm thickness, the micro-lattice structured electrode exhibited a much higher specific capacity at around 150 mAh/g, thirty times higher than that of block structure. The specific capacity of the 250 µm thick micro-lattice structure was approximately 250 mAh/g, close to the theoretical capacity of the referenced Ag electrode (290 mAh/g) (Jung, H.-R., et al. 2011 *Solid State Ionics*, 187(1):50-57). Therefore, the micro-lattice structure of FIG. 10B (left image) was proven to improve the utilization of active material in the electrode and realize both a high specific capacity and power density (22 µW/mm$^2$) in the thick electrode.

Modeling Results: Electrochemical Performance

Figure 12A:
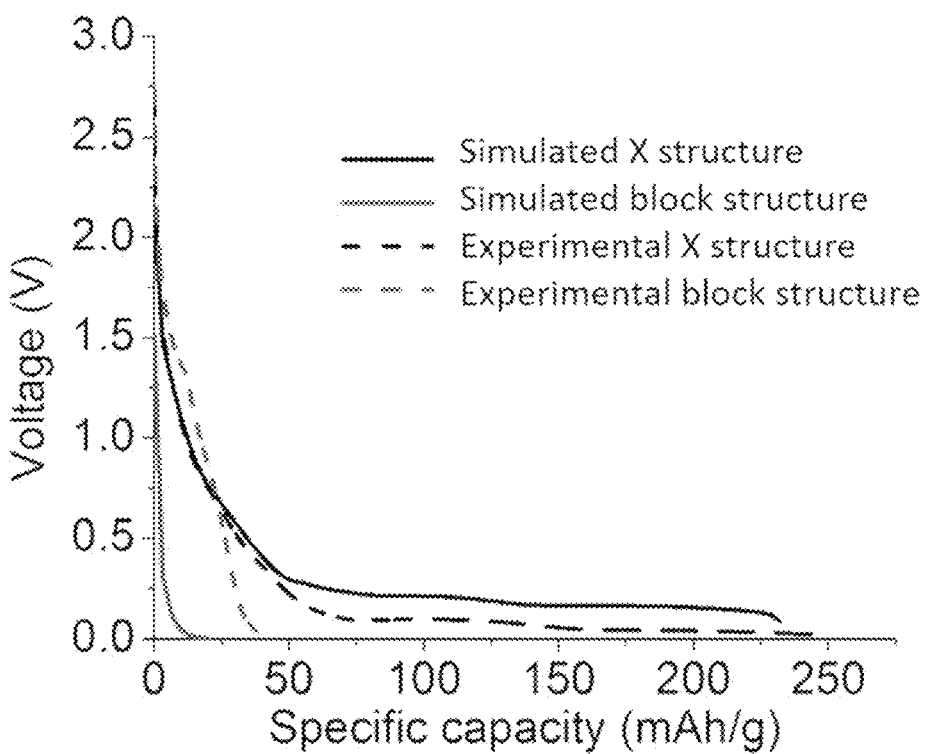
FIGS. 12A-12C.
Figure 12B:
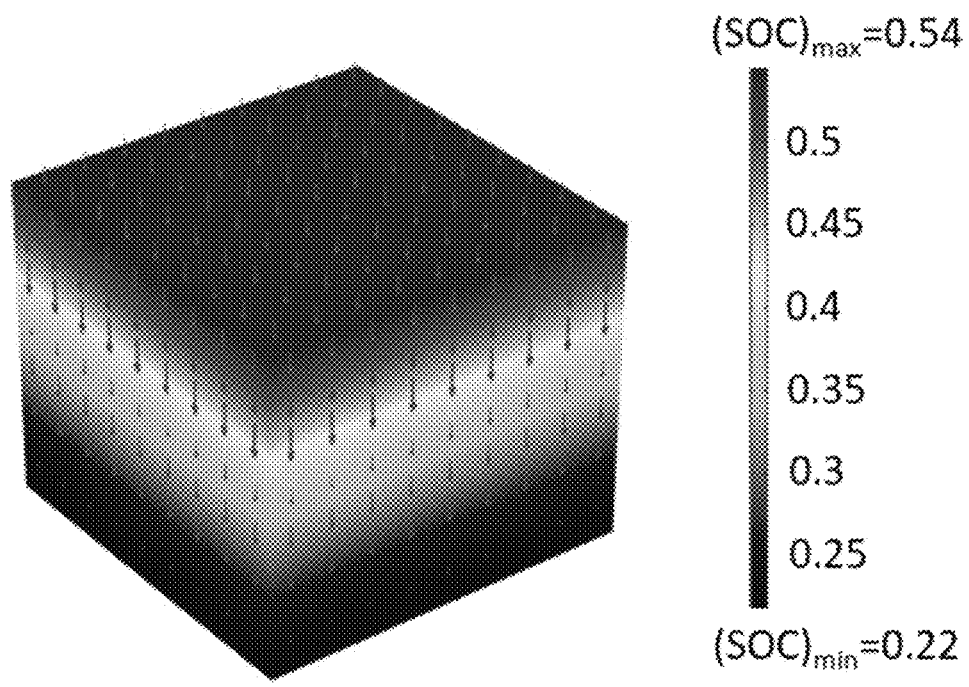
Figure 12C:
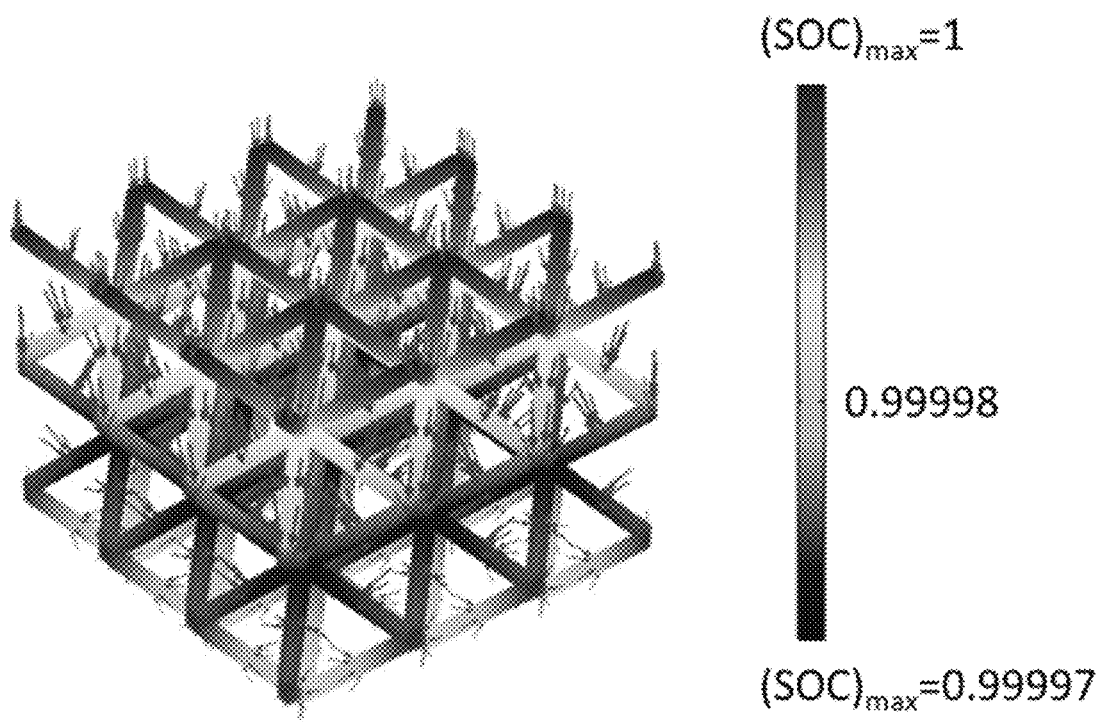

To validate the model, simulation results were compared with experimental electrochemical performance data of the micro-lattice and block structured electrodes with 250 µm thicknesses, as shown in FIG. 12A. The simulated discharge profiles of the two structures were, in general, in accordance with the experimental results, where the impact of electrode geometry is well captured. FIGS. 12B and 12C represent the spatial distribution of the state of charge (SOC) at 0.02 V in the micro-lattice and block structures from the simulation, respectively. Due to the species transportation limitation, the maximum SOC in blocked structured electrode was only 0.54. The SOC for the block structured electrode had a decrease from the electrode/separator interface to the electrode/current collector interface. The change in SOC (ΔSOC) was 0.32, resulting in a small average SOC for the entire electrode. The simulation of the block structured electrode of FIG. 12B indicated that the flux of lithium ions (red arrows) entered the electrode material from top surface only. In comparison, the SOC for the micro-lattice structured electrode was greater than 0.99 at all positions, which indicated a high degree of material utilization within the electrode. The micro-lattice of FIG. 12C had a lithium ion flux distribution, with various directions, at the surface of every truss member, which largely improved the efficiency of lithium ion transfer. Therefore, the high material utilization could be attributed to the larger surface area of the micro-lattice structure.

Figure 13A:
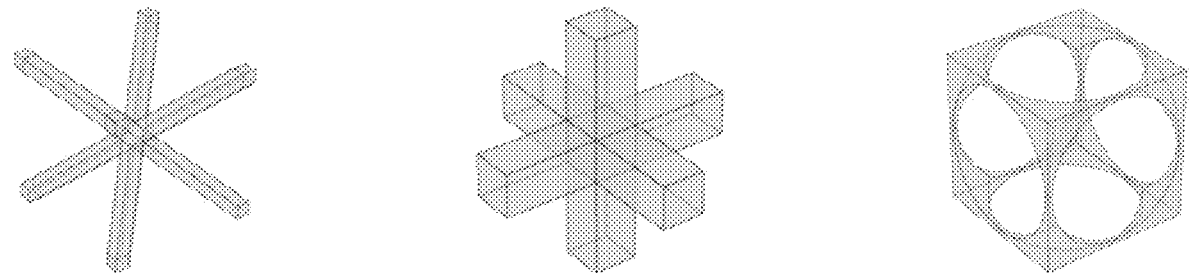
FIGS. 13A-13E.
Figure 13B:
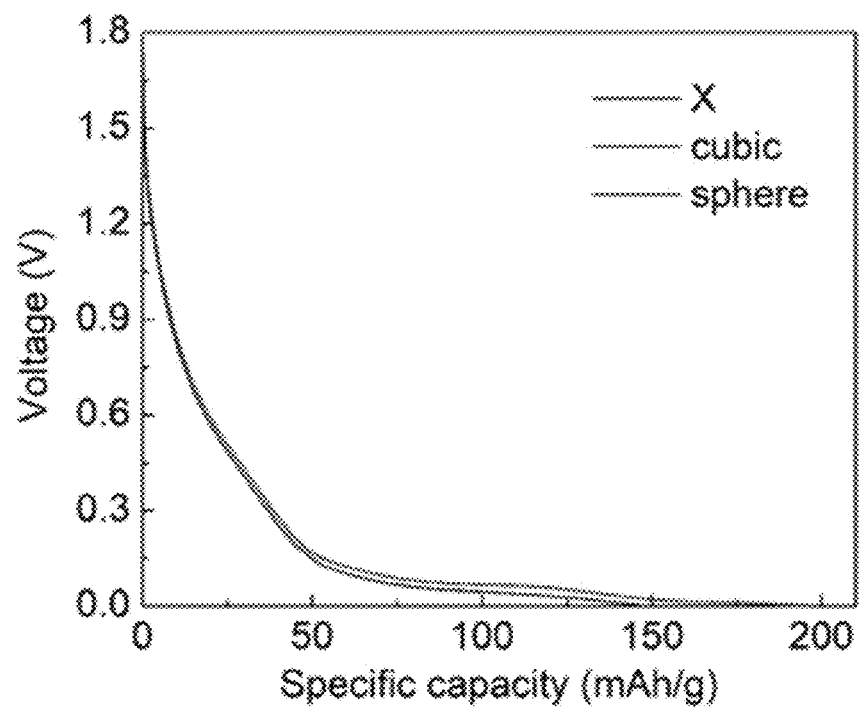
Figure 13C:
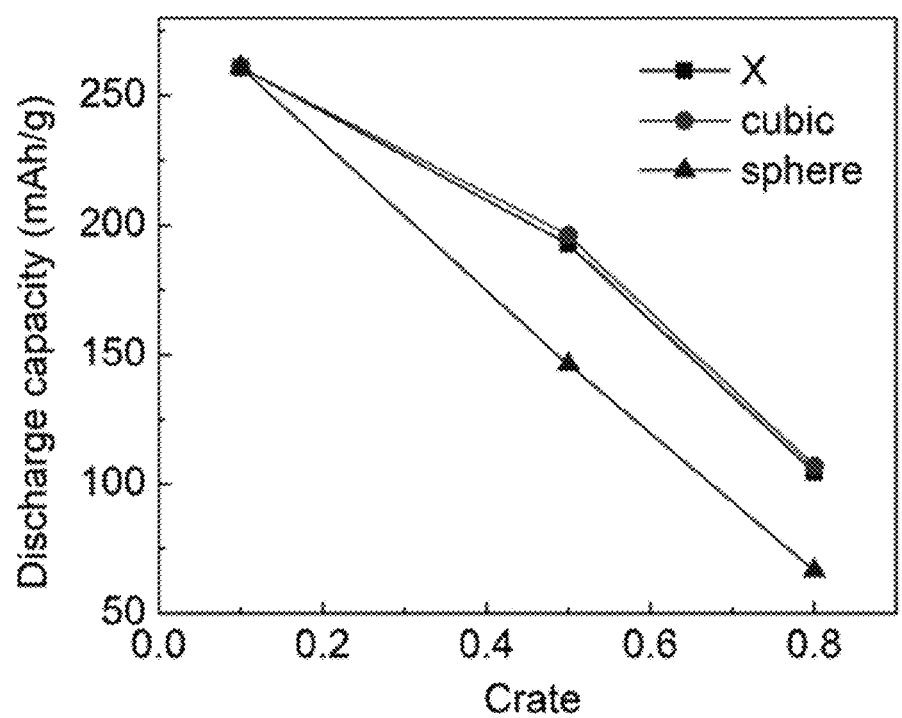

Based on the validated model, the impact of different 3D structures on cell properties were explored. The structures investigated were the micro-lattice structure, a cubic structure, and a spherical structure and the unit cell constructing these structures are shown in FIG. 13A. To exclude the influence of mass, the investigated structures were manipulated to be identical in mass within the same size box. As shown in FIG. 13B, the specific capacity of both the micro-lattice and cubic structure were close to the reported theoretical capacity of silver, which is around 290 mAh/g (Jung, H.-R., et al. 2011 *Solid State Ionics*, 187(1):50-57). The spherical structured electrode had a relatively lower specific capacity. FIG. 13C shows that the capacity of the cubic structure was slightly higher than that of micro-lattice structure, while the capacity of spherical structure was approximately half of the discharge current at both 0.5C and 0.8C. The spatial distribution of lithium ion concentration of the three structures are presented in FIG. 13D. At 0.02 V, the range of SOC in the micro-lattice and cubic structure were both approximately 0.7 to 0.9 with a low SOC gradient. The spherical structure had wide range of SOC of approximately 0.54 to 0.68, with a maximum SOC of 0.68. These results indicated a low efficiency in material utilization for the spherical structure.

Figure 13D:
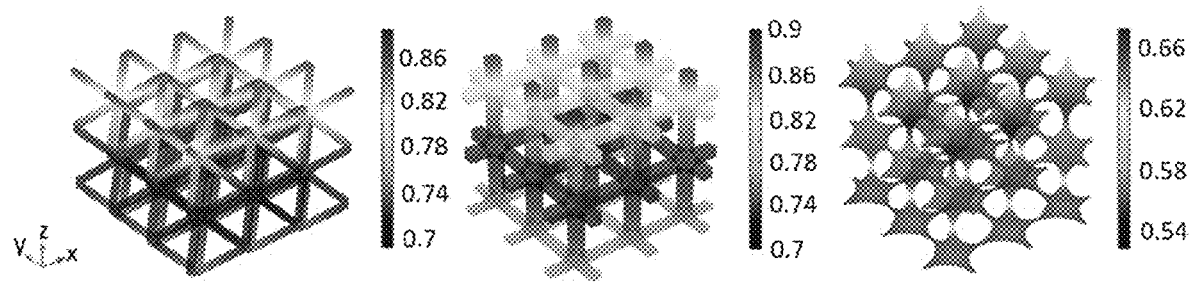
Figure 13E:
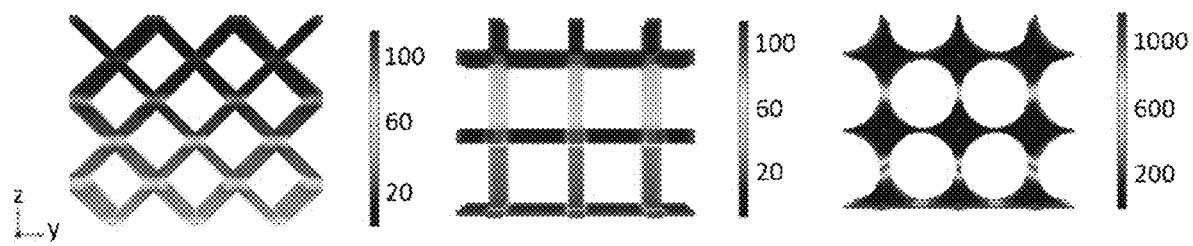

In the model, the top surface at the Z axis is the electrolyte/electrode interface and the bottom surface is the electrode/collector interface (FIGS. 10B, 13D and 13E). It was observed that in the micro-lattice and cubic structures, the SOC was highest at the electrolyte side, with a gradual decrease towards the current collector side. However, in the spherical structure, the highest SOC was at the current collector side. In the spherical structure, the limiting factor was electron transport in solid phase. As the transport rate at the thinnest point between the two unit cells of the spherical structure was too low, electrons tended to accumulate at the bottom of the structure. In both the micro-lattice and cubic structures, the electron transport in Z-axis direction was uniform. Therefore, the limiting factor of SOC homogenization in the micro-lattice and cubic structures was lithium ion transfer. Since the lithium ion flux was at the top surface of both the micro-lattice and cubic structures, the highest SOC was therefore at the top side of the structure. This was further proved by the gradient of solid-phase potential of FIG. 13E, which could represent the electron concentration to some degree. As shown in FIG. 13E, the bottleneck of electron transport was at the intersection of hexagonal prisms, the cubic column, and the thinnest part at the column in micro-lattice structure, cubic structure, and spherical structure, respectively. Most importantly, the largest gradient of the solid-phase potential in the spherical structure was approximately ten times of that in the micro-lattice and cubic structures, indicating a limit of electron transportation caused by electrode geometry.

Figure 14A:
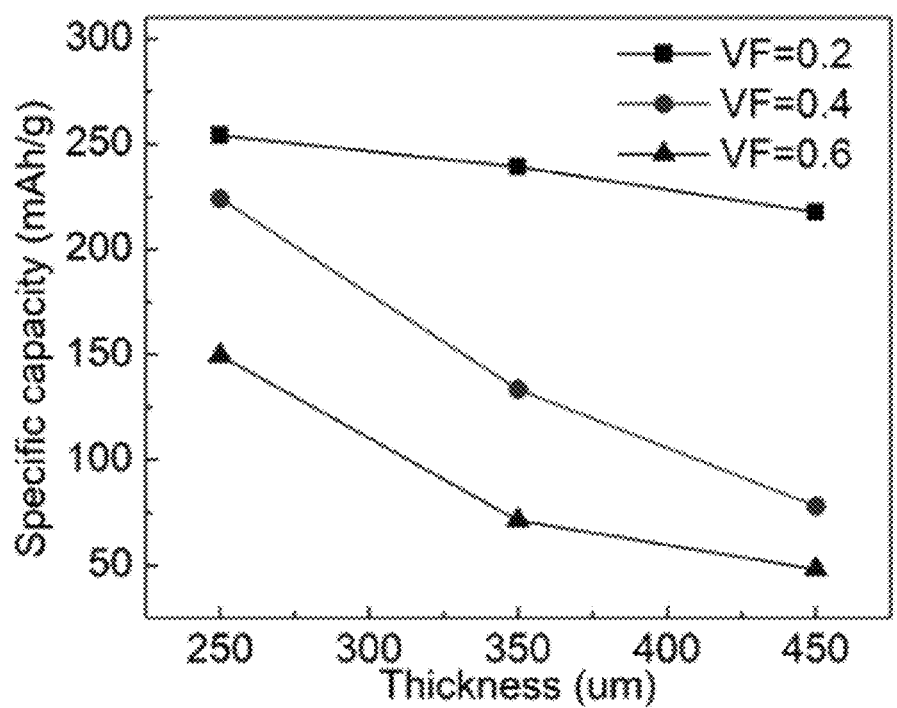
FIGS. 14A-14F.
Figure 14B:
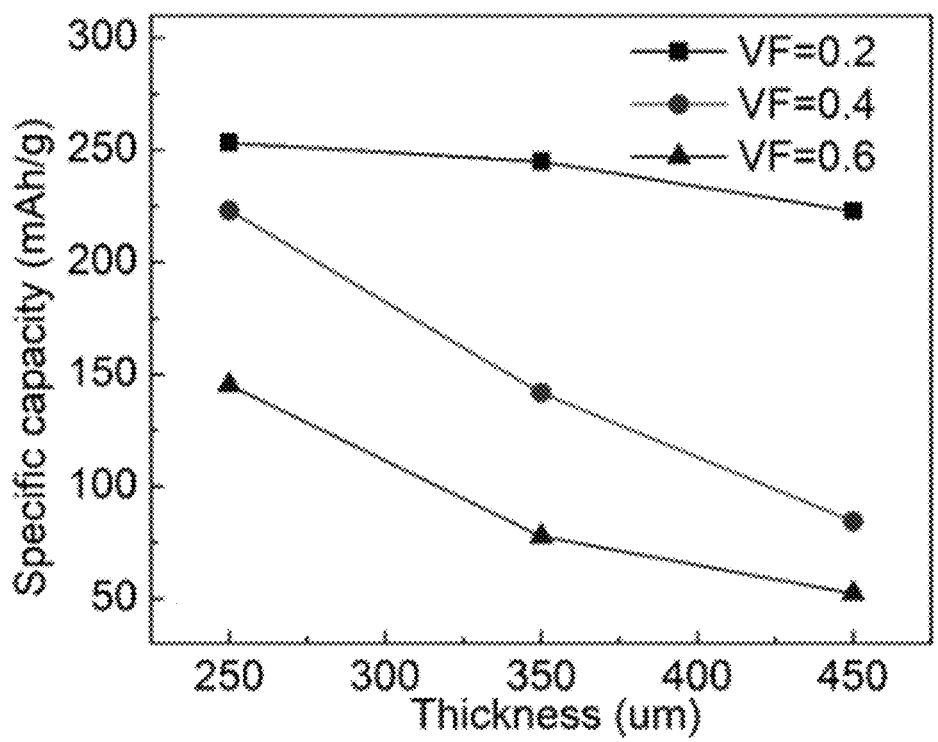
Figure 14C:
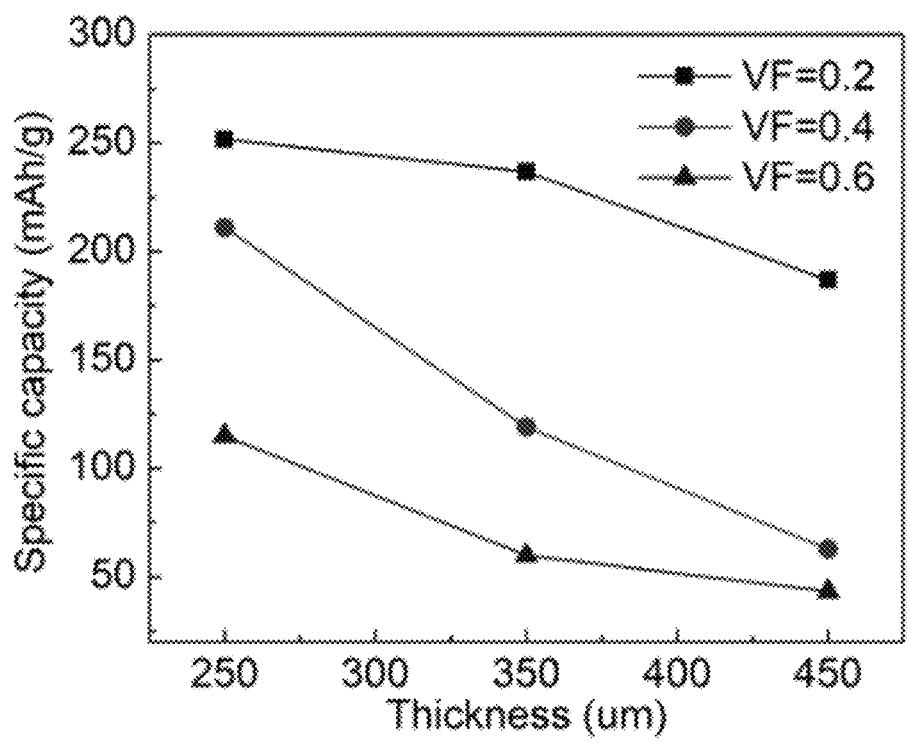
Figure 14D:
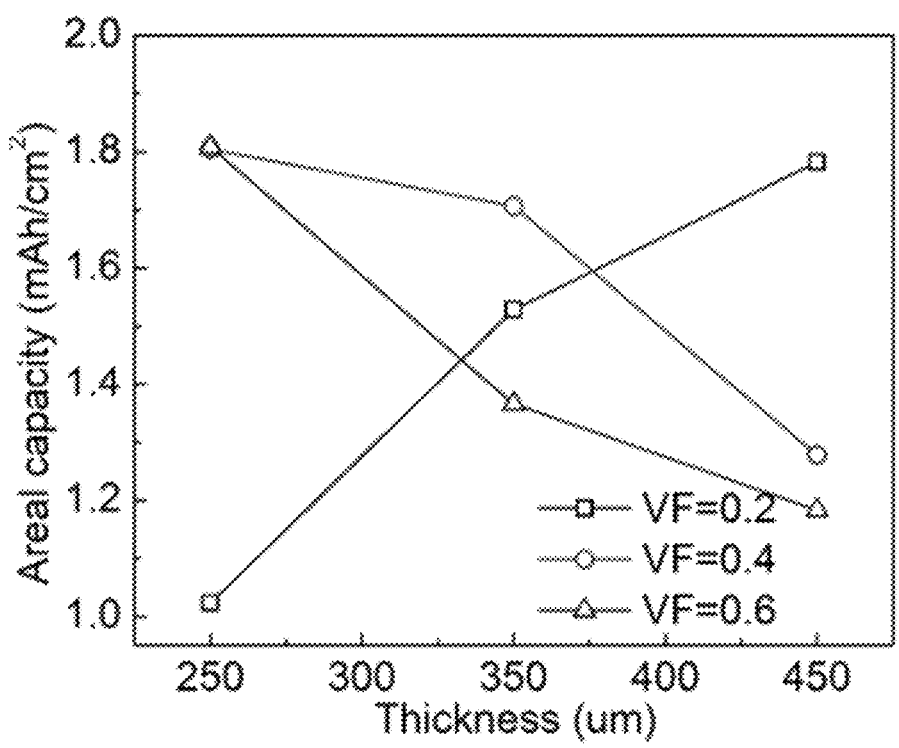
Figure 14E:
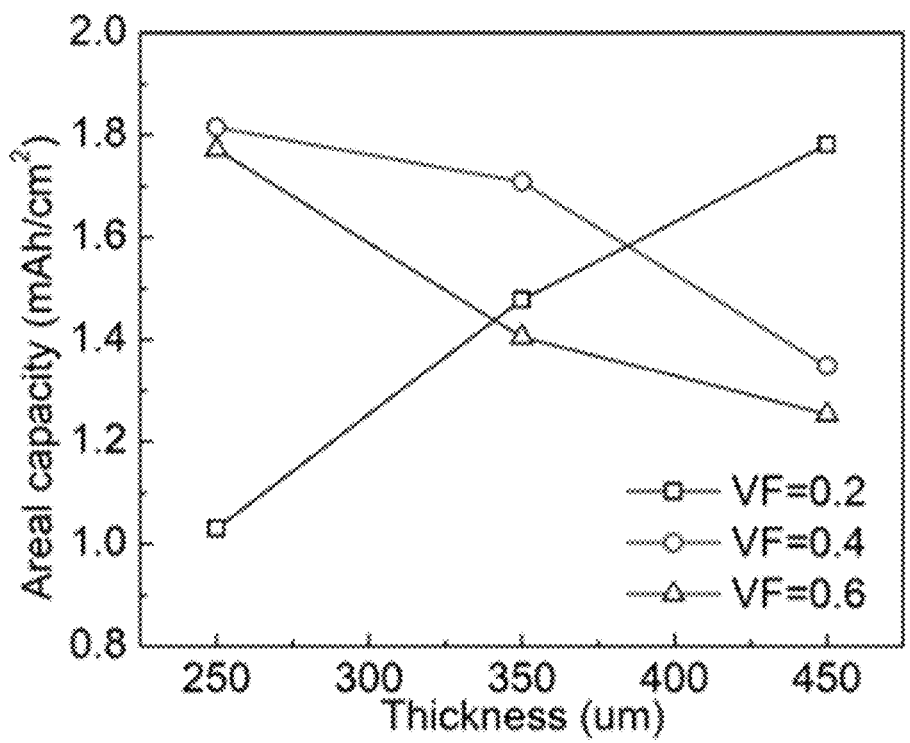
Figure 14F:
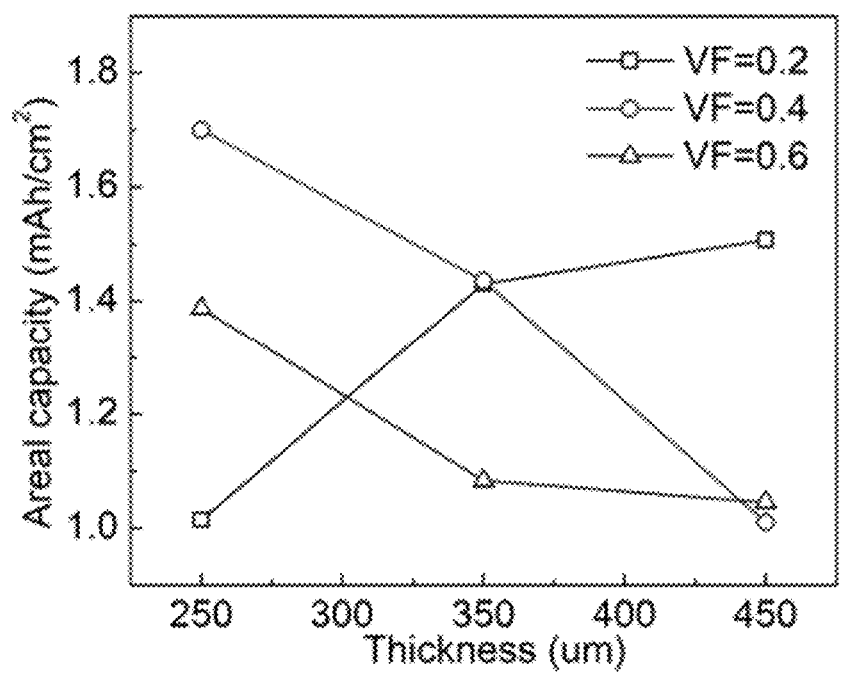

Thickness and porosity are two controllable parameters in electrode processing. FIGS. 14A, 14B, and 14C show the specific capacity and FIGS. 14D, 14E, and 14F show the areal capacity of the three structures at different thicknesses and porosity. FIGS. 14A, 14B, and 14C, indicated that the specific capacity of all three structures decreased as the thickness and solid-phase volume fraction increased, as a thicker and denser structures limit the transport of ions and electrons. However, thicker and denser structures also provide more active material in a certain foot area, e.g., a larger total mass. Therefore, as shown in FIGS. 14D, 14E, and 14F, the trends of areal capacity change were different with increasing electrode thickness and solid-phase volume fraction. According to the simulation results of FIGS. 14A-14F, to obtain both a high specific capacity and high areal capacity, the optimal parameters were determined to be: (1) a thickness of 450 µm and a solid phase volume fraction (VF) of 0.2 or (2) a thickness of 250 µm and a VF of 0.4 for the micro-lattice and cubic structures and a thickness of 250 µm and a VF of 0.4 for the spherical structure.

Figure 15A:
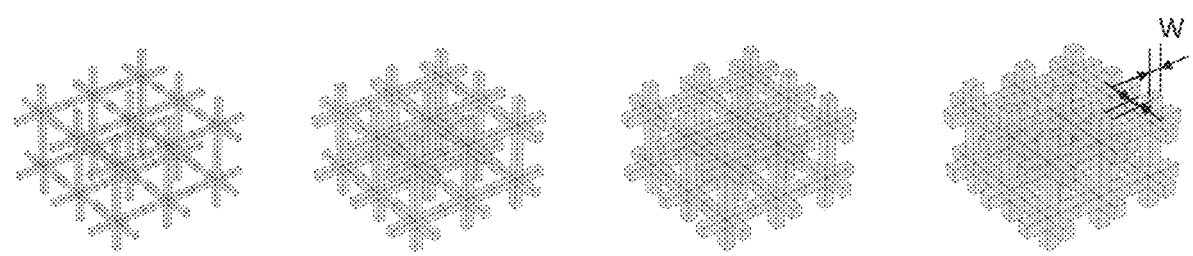
FIGS. 15A-15D.
Figure 15B:
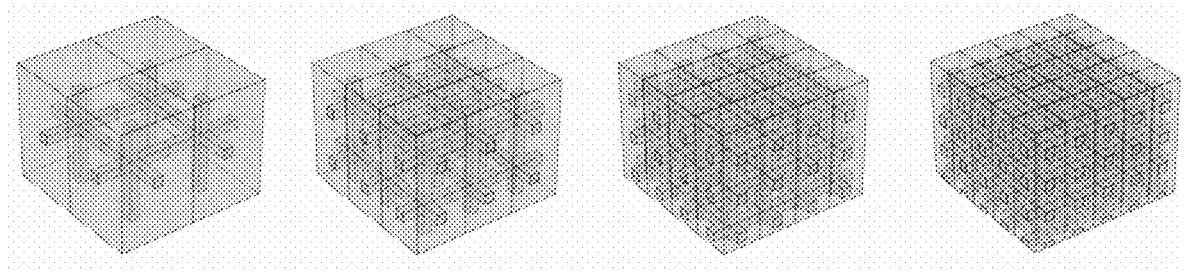
Figure 15C:
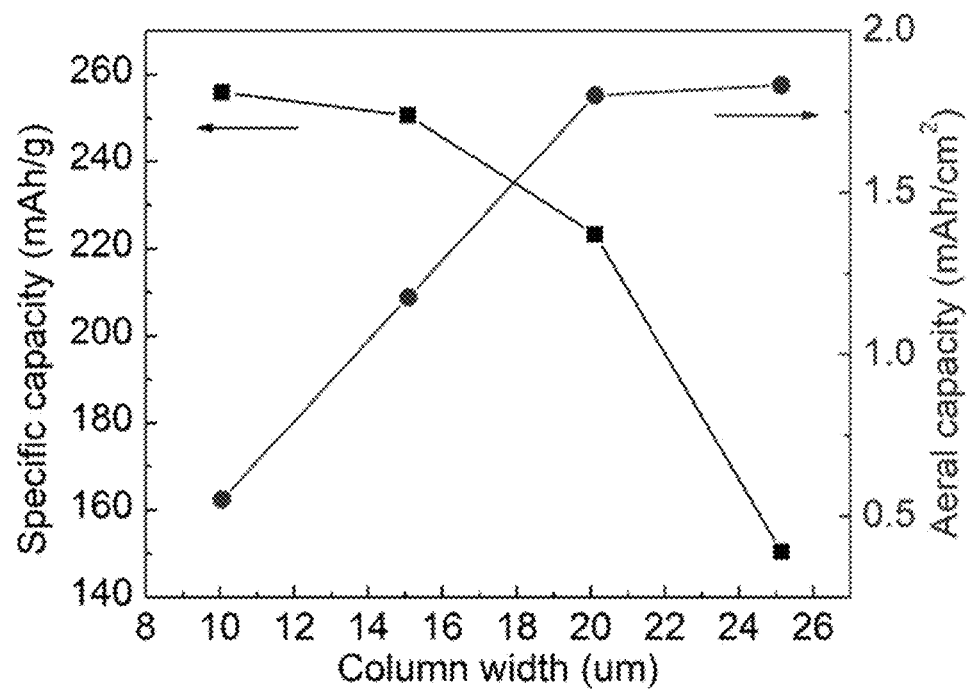
Figure 15D:
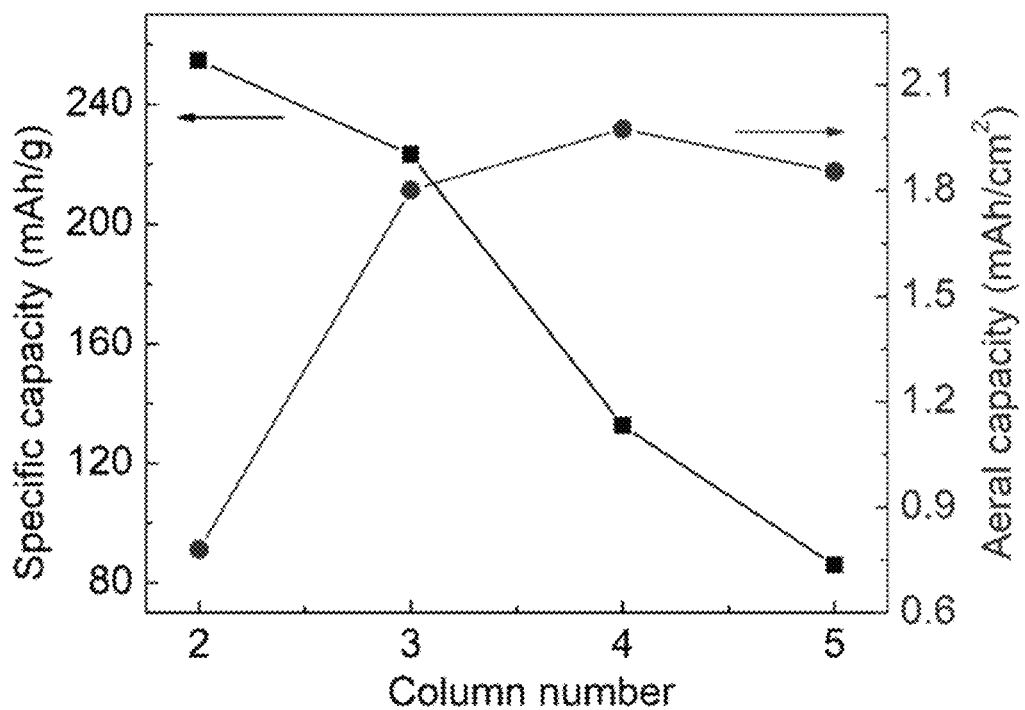

To obtain the optimal design of electrode geometry, different parameters of geometry were investigated. In the cubic structure, the effect of two parameters were considered: the width of cubic column (FIG. 15A) and the column number in one unit cell (FIG. 15B). The specific and areal capacity of column width of 0.5w, 0.75w, 1.00w and 1.25w (w=20.12 μm) are plotted in FIG. 15C. In terms of column width, the specific capacity and areal capacity showed a reverse trend. The specific capacity decreased as a result of a limited species transport, while the areal capacity increased due to the increasing mass of the structures with controlled wider columns. According to FIG. 15C, the optimal column width was around 17.92 μm, the intersection of the two plots. The same trend was observed in FIG. 15D, except that when column number exceeded four, the areal capacity began decreasing because of the large gradient of SOC. Since the specific capacity was too low when the column number was larger than four, the optimal column number in one unit cell was determined to be three for the cubic structure.

Figure 16A:
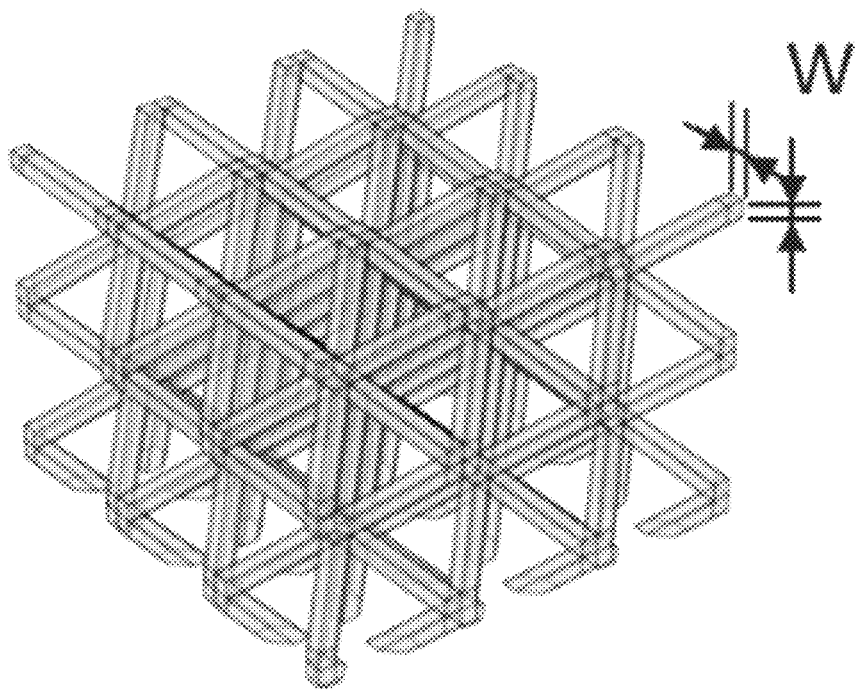
FIGS. 16A-16F.
Figure 16B:
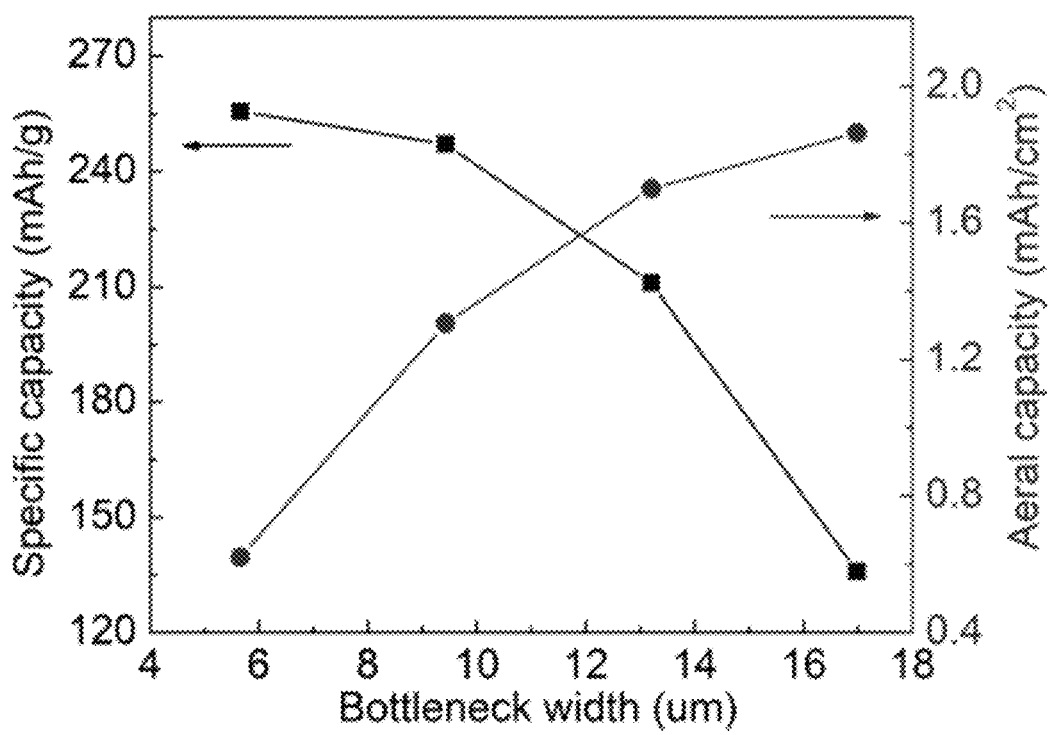
Figure 16C:
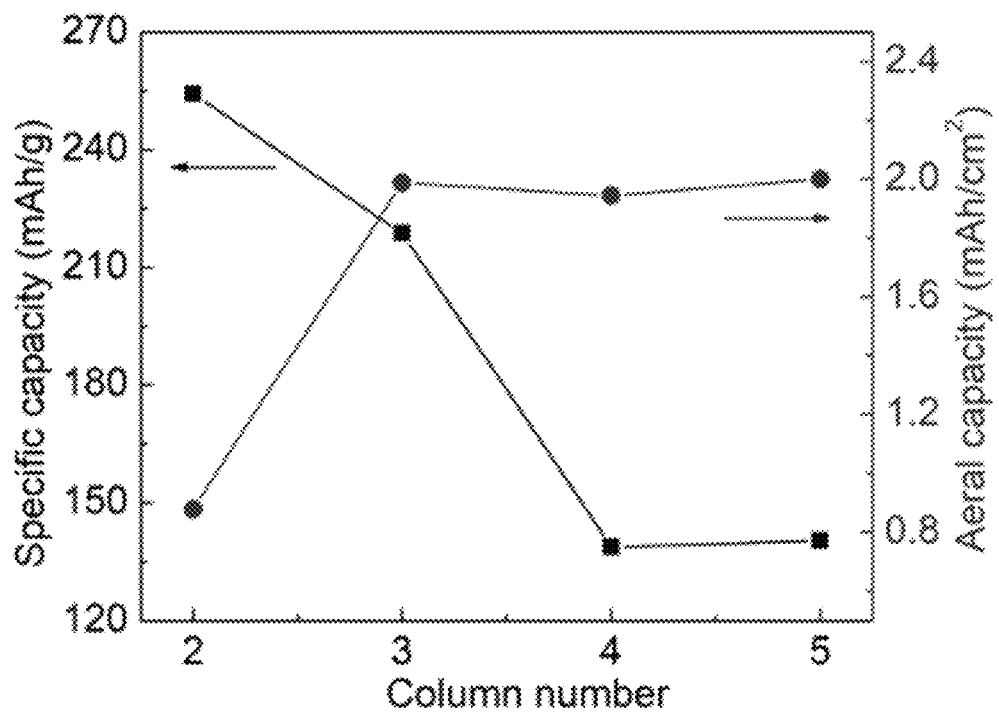
Figure 16D:
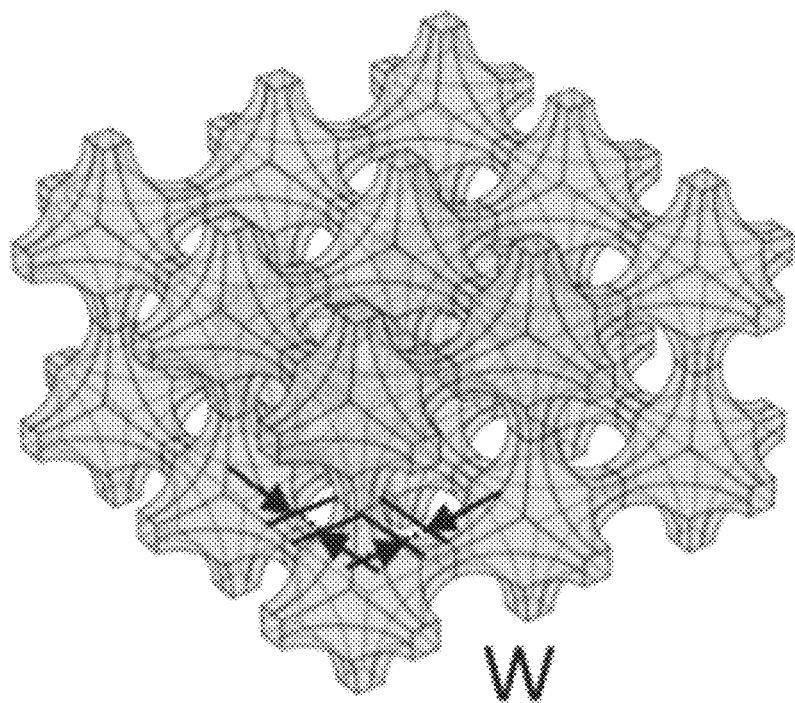
Figure 16E:
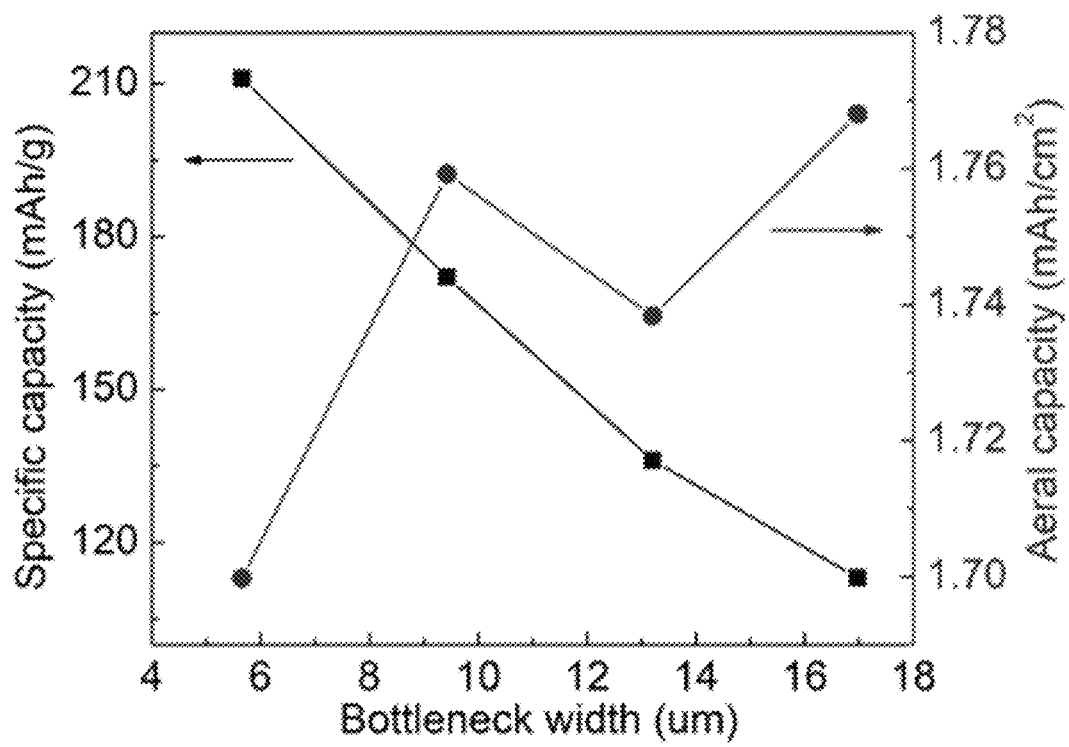
Figure 16F:
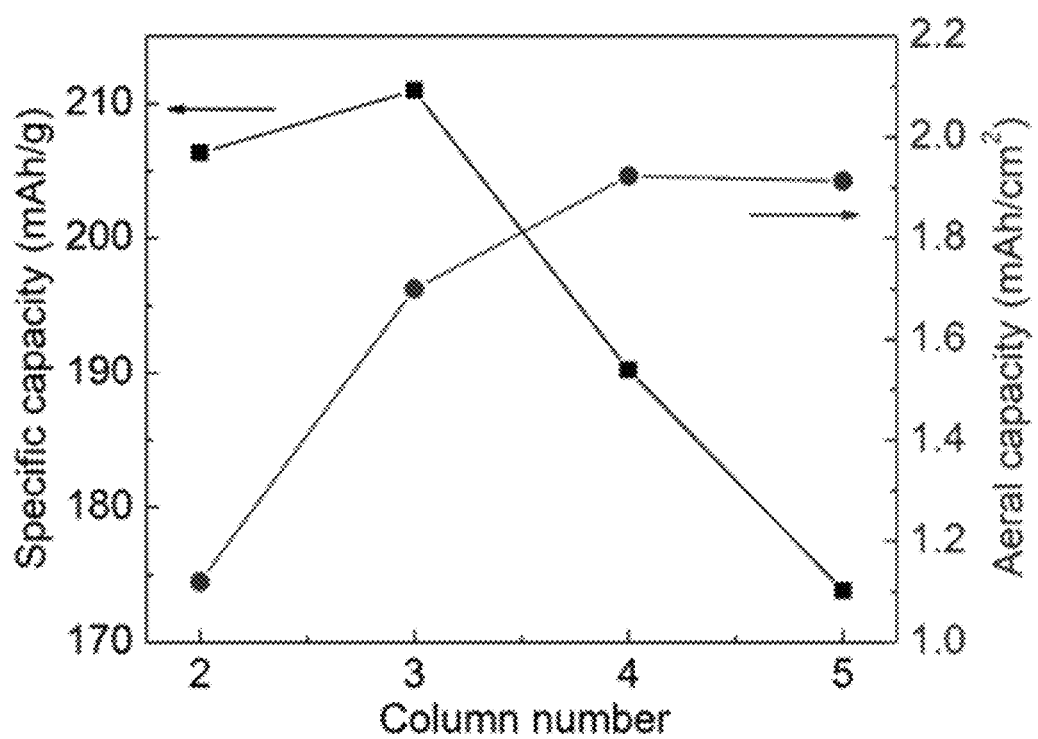

The parameters in the micro-lattice and spherical structures were also studied, as shown in FIGS. 16A, 16B, 16C, 16D, 16E, and 16F. The column width (FIG. 16B) and column number (FIG. 16C) in the micro-lattice structure is the edge length of hexagonal prisms (FIG. 16A). The bottleneck width of the spherical structure is the thinnest part of the unit cell, which is made by the subtraction of a sphere from a cube (FIG. 16D). Similar to the cubic structure, as the column width or column number increased, the specific capacity in both the micro-lattice and spherical structure decreased. However, due to the tradeoff between specific capacity and total mass, the areal capacity had different trends for different parameters and structures. In the micro-lattice structure, as the specific capacity decreased too quickly as the column width increased, there was a turning point in the areal capacity curve around 7.5 μm, which could be the best value of the column width. In FIG. 16C, when the column number was larger than four, both the specific and areal capacity did not change significantly. Therefore, it was determined that a column number of two or three was best depending on the purpose of the designed cell. In the spherical structure, as previously explained, the main limiting factor of electrode property was the electron transport in solid phase, thus the bottleneck width, as shown in FIG. 16D was investigated. As a result, the spherical structure with a bottleneck width of around 8.84 μm was found to perform the best (FIG. 16E), and a column number of three or four could be considered for an electrode design (FIG. 16F).

The following numbered clauses depict various aspects of the invention:

Clause 1: A method of manufacturing a component for an electrochemical device, such as an electrode, a current collector, or an electrolyte material, comprising: depositing a three-dimensional open cell lattice onto a surface of a substrate by droplet-based printing of nanoparticles comprising a lattice-forming material, the lattice comprising a plurality of unit cells, each unit cell comprises a plurality of trusses joined at one or more joints and, together with one or more unit cells of the lattice, forming a repeated pattern of trusses defining at least a portion of the lattice and with a periodicity of at least 1 μm per unit cell, such as ranging from 1 μm to 1 mm per unit cell.

Clause 2: The method of clause 1, wherein each truss of the plurality of unit cells has a diameter of at least 1 μm, such as ranging from 1 μm to 100 μm.

Clause 3: The method of clause 1 or 2, wherein the lattice comprises from 10 to 100,000 repeated cells in at least one dimension.

Clause 4: The method of any one of clauses 1-3, wherein the lattice is deposited as an ink comprising the nanoparticles of the lattice-forming material, a binder, and a solvent.

Clause 5: The method of clause 4, wherein the substrate is heated from 50° C. or greater, or increments there between, such as from 50° C. to 150° C., 80° C., 100° C., 110° C., or 125° C., during deposition of the trusses to evaporate the solvent.

Clause 6: The method of any one of clauses 1-5, wherein the lattice-forming material is a metal, a ceramic, amorphous carbon, or a carbon allotrope, or a combination of any of the preceding.

Clause 7: The method of clause 6, wherein the lattice-forming material is a metal.

Clause 8: The method of clause 7, wherein the metal comprises lithium, sodium, aluminum, magnesium, silicon, zinc, silver, tin, antimony, bismuth, gold, or alloys of any of the preceding, or combinations of any of the preceding.

Clause 9: The method of clause 7, wherein the metal is silver.

Clause 10: The method of clause 6, wherein the material is silicon, lithium titanate, tin oxide, silicon oxide, lithium manganese, lithium cobalt oxide, iron sulfide, vanadium pentoxide, lithium nickel cobalt manganese oxide, lithium ion phosphate, or alloys of any of the preceding, or combinations of any of the preceding.

Clause 11: The method of clause 7, wherein the material is a carbonaceous material such as graphite, hard carbon, synthetic graphite, carbon black, graphene flakes, carbon nanotubes, or combinations thereof.

Clause 12: The method of any one of clauses 4-11, wherein the solvent comprises deionized water, ethylene glycol, toluene, hexane, 2-methoxyethanol, glycerol, 2-amino-2-methyl-1-propanol (AMP), or tetradecane, or a combination of any of the preceding.

Clause 13: The method of clause 12, wherein the solvent comprises ethylene glycol.

Clause 14: The method of any one of clauses 4-13, wherein the binder comprises a polyalkylene carbonate, an acrylic resin, or 2-methoxyethanol, or a combination of any of the preceding.

Clause 15: The method of any one of clauses 1-14, wherein the nanoparticles, as deposited, are metal particles coated with a polymeric coating.

Clause 16: The method of clause 15, wherein the polymeric coating comprises poly(ethylene glycol), polyethylenimine, thiols, or amines, or a combination of any of the preceding.

Clause 17: The method of any one of clauses 1-16, further comprising sintering the lattice.

Clause 18: The method of clause 17, wherein the sintering is conducted at a temperature effective to produce pores in the trusses, thereby producing a hierarchical porosity in the lattice.

Clause 19: The method of clause 18, wherein the porosity of the trusses ranges from greater than 0% to 30%, greater than 1%, or from 1% to 20%, optionally as measured by X-ray computer tomography (CT) scanning or by physical cross sectioning.

Clause 20: The method of clause 1, wherein the nanoparticles are silver nanoparticles in ethylene glycol, the substrate is heated to a temperature ranging from 100°

C. to 120° C. during deposition of the nanoparticles, the lattice is deposited in an octahedral configuration, and, after the lattice is deposited, it is sintered at a temperature ranging from 150° C. to 400° C. for from 10 minutes to four hours.

Clause 21: The method of clause 20, wherein the lattice is sintered at above 100° C., such as about 350° C. for about two hours.

Clause 22: The method of clause 1, wherein the nanoparticles are silver nanoparticles in ethylene glycol, the substrate is heated to a temperature above 100° C. during deposition of the nanoparticles, the lattice is deposited in an octahedral configuration, and, after the lattice is deposited, it is sintered at a temperature above 150° C. for at least 10 minutes.

Clause 23: The method of any one of clauses 1-22, further comprising coating the lattice with an electrically active material.

Clause 24: The method of any one of clauses 1-23, wherein the truss is a rod, a cylinder, a column, a scutoid, a cylindroid, a conical shape, a polyhedron, a sphere, a spheroid, an ovoid, a spiral, or a helix.

Clause 25: The method of any one of clauses 1-24, wherein the component is an electrode, a current collector, or an electrolyte material.

Clause 26: The method of any one of clauses 1-24, wherein the cells are polyhedral, such as octahedral, tetrahedral, cubic, cuboid, rhomboid, spherical, spheroid, or combinations thereof.

Clause 27: An electrode structure, comprising: an open cell lattice comprising a plurality of unit cells defined by a plurality of porous, interconnected, conductive metal, ceramic, or carbonaceous trusses having a diameter above 1 μm, such as ranging from 1 μm to 100 μm, periodically-spaced with periodicity of at least 1 μm per unit cell, such as ranging from 1 μm to 1000 μm, from 2 μm to 500 μm, from 10 μm to 1000 μm, or from 100 μm to 300 μm.

Clause 28: The electrode structure of clause 27, wherein the porosity of the trusses ranges from greater than 0% to 30%, greater than 1%, or from 1% to 20%, optionally as measured by X-ray computer tomography (CT) scanning or by physical cross sectioning.

Clause 29: The electrode structure of clause 27 or 28, wherein the trusses are sintered metal.

Clause 30: The electrode structure of clause 29, wherein the metal is silver.

Clause 31: The electrode structure of any one of clauses 27-30, comprising at least 1 Mode of deformation as determined by $M=-3j+b+6$, where M represents the number of modes, j represents the number of frictionless joints, and b is the number of links.

Clause 32: The electrode structure of any one of clauses 27-31, having a specific capacity in a lithium ion electrochemical cell after 30 charge and discharge cycles that is at least 50% greater than a solid electrode of the same material.

Clause 33: The electrode structure of any one of clauses 27-31, having an area-normalized specific capacity measured in a lithium ion electrochemical cell under different C-rates of 0.1C, 0.2C, and 0.5C, and twice at 1C for a total of 40 cycles that is at least 50% greater than a solid electrode of the same material.

Clause 34: An electrode structure comprising a lattice prepared according to any one of clauses 1-26.

Clause 35: The electrode structure of clause 34, comprising at least 1 Mode of deformation as determined by $M=-3j+b+6$, where M represents the number of modes, j represents the number of frictionless joints, and b is the number of links.

Clause 36: The electrode structure of clause 34, having a specific capacity in a lithium ion electrochemical cell after 30 charge and discharge cycles that is at least 50% greater than a solid electrode of the same material.

Clause 37: The electrode structure of clause 34, having an area-normalized specific capacity measured in a lithium ion electrochemical cell under C-rates of 0.1C, 0.2C, and 0.5C, and twice at 1C for a total of 40 cycles that is at least 50% greater than a solid electrode of the same material.

Clause 38: An electrochemical cell comprising an anode, a cathode, a separation membrane, and an electrolyte contained within a housing, wherein the anode and/or cathode comprises a three-dimensional lattice structure prepared according to any one of clauses 1-26.

Clause 39: The electrochemical cell of clause 38, using sodium, potassium, magnesium, or lithium ions for charge transfer.

Clause 40: The electrochemical cell of clause 38, using lithium ions for charge transfer and the electrolyte optionally comprises $LiFP_6$.

Clause 41: The electrochemical cell of clause 40, wherein the cathode comprises a lithium oxide, $LiFePO_4$, $LiCoO_2$, or sulfur.

Clause 42: A battery or capacitor comprising the electrochemical cell of clause 38.

Clause 43: An electrochemical cell comprising an anode, a cathode, a separation membrane, and an electrolyte contained within a housing, wherein the anode and/or cathode comprises the electrode structure of any one of clauses 27-33.

Clause 44: The electrochemical cell of clause 43, using sodium, potassium, magnesium, or lithium ions for charge transfer.

Clause 45: The electrochemical cell of clause 43, using lithium ions for charge transfer and the electrolyte optionally comprises $LiFP_6$.

Clause 46: The electrochemical cell of clause 43, wherein the cathode comprises a lithium oxide, $LiFePO_4$, $LiCoO_2$, or sulfur.

Clause 47: A battery or capacitor comprising the electrochemical cell of clause 43.

Having described this invention, it will be understood to those of ordinary skill in the art that the same can be performed within a wide and equivalent range of conditions, formulations, and other parameters without affecting the scope of the invention or any embodiment thereof.

What is claimed is:

1. An electrode incorporated within an electrochemical cell, the electrochemical cell comprising:
the electrode;
a cathode;
a polymeric permeable membrane; and
a liquid electrolyte,
wherein the electrode comprises: a three-dimensional open cell lattice comprising a plurality of unit cells defined by a plurality of porous, interconnected, conductive metal[,] or ceramic trusses formed by droplet-based printing having a diameter ranging from 20 μm to 50 μm, periodically-spaced with periodicity ranging from 2 μm to 500 μm per unit cell in an X-dimension, a Y-dimension, and/or a Z-dimension,
wherein the electrode comprises a thickness from about 250 μm to about 450 μm, wherein the cathode comprises lithium oxide, lithium cobalt oxide, lithium manganese oxide, lithium titanium oxide, lithium nickel oxide, lithium iron phosphate fluoride, lithium cobalt nickel manganese oxide, lithium cobalt nickel manganese oxide, silicon, lithium ferrophosphate, sulfur, a lithium foil, or combinations thereof, wherein the polymeric permeable separator comprises polyolefin, polyethylene, polypropylene, or combinations thereof, and wherein the liquid electrolyte comprises ethylene carbonate, propylene carbonate, ethyl methyl carbonate, or a combination thereof and further comprises $LiPF_6$, $LiAsF_6$, $LiClO_4$, $LiBF_4$, lithium triflate, or combinations thereof.

2. The electrode of claim 1, wherein the lattice comprises from 10 to 100,000 repeated cells in at least one dimension.

3. The electrode of claim 1, wherein the conductive metal comprises lithium, sodium, aluminum, magnesium, silicon, zinc, silver, tin, antimony, bismuth, gold, or alloys of any of the preceding, or combinations of any of the preceding.

4. The electrode of claim 1, wherein the truss is a rod, a cylinder, a column, a scutoid, a cylindroid, a conical shape, a polyhedron, a sphere, a spheroid, an ovoid, a spiral, or a helix.

5. The electrode of claim 1, wherein the porosity of the trusses is greater than 1%.

6. The electrode of claim 5, wherein the trusses are sintered metal.

7. The electrode of claim 6, wherein sintered metal is silver.

8. The electrode of claim 1, comprising at least 1 Mode of deformation as determined by $M=-3j+b+6$, where M represents the number of modes, j represents the number of frictionless joints, and b is the number of links, wherein the electrode has a specific capacity in a lithium ion electrochemical cell after 30 charge and discharge cycles that is at least 50% greater than a solid electrode of the same material, and/or having an area-normalized specific capacity measured in a lithium ion electrochemical cell under different C-rates of 0.1C, 0.2C, and 0.5C, and twice at 1C for a total of 40 cycles that is at least 50% greater than a solid electrode of the same material.

9. An electrochemical cell comprising an anode, a cathode, a separation membrane, and an electrolyte contained within a housing, wherein the anode comprises the electrode of claim 1.

10. The electrode of claim 1, wherein the liquid electrolyte comprises a combination of ethylene carbonate, propylene carbonate, and ethyl methyl carbonate and further comprises $LiFP_6$.

11. A battery or capacitor comprising the electrode of claim 1.

12. The electrode of claim 1, wherein the component is at least partially coated with an electrically active material.

13. The electrode of claim 1, wherein the cells are polyhedral, such as octahedral, tetrahedral, cubic, cuboid, rhomboid, spherical, spheroid, or combinations thereof.

14. The electrode of claim 1, wherein the periodicity ranges from 100 μm to 300 μm per unit cell in an X-dimension, a Y-dimension, and/or a Z-dimension.

15. The electrode of claim 1, wherein the polymeric permeable separator comprises a combination of polyethylene and polypropylene.

16. The electrode of claim 1, wherein the electrode comprises a solid-phase volume fraction (VF) of from 0.2 to 0.6.

* * * * *

UNITED STATES PATENT AND TRADEMARK OFFICE
CERTIFICATE OF CORRECTION

| | | |
|---|---|---|
| PATENT NO. | : 11,817,588 B2 | Page 1 of 1 |
| APPLICATION NO. | : 16/593622 | |
| DATED | : November 14, 2023 | |
| INVENTOR(S) | : Rahul Panat et al. | |

It is certified that error appears in the above-identified patent and that said Letters Patent is hereby corrected as shown below:

In the Claims

Column 28, Line 61, Claim 1, delete "metal[,]" and insert -- metal --

Signed and Sealed this
Ninth Day of April, 2024

Katherine Kelly Vidal
*Director of the United States Patent and Trademark Office*